(12) United States Patent
Magnell

(10) Patent No.: US 10,578,074 B2
(45) Date of Patent: Mar. 3, 2020

(54) UNDERWATER ENERGY GENERATING SYSTEM

(71) Applicant: The Woods Hole Group, Inc., East Falmouth, MA (US)

(72) Inventor: Bruce A. Magnell, North Chelmsford, MA (US)

(73) Assignee: The Woods Hole Group, Inc., East Falmouth, MA (US)

( * ) Notice: Subject to any disclaimer, the term of this patent is extended or adjusted under 35 U.S.C. 154(b) by 0 days.

(21) Appl. No.: 15/793,953

(22) Filed: Oct. 25, 2017

(65) Prior Publication Data

US 2018/0058418 A1 Mar. 1, 2018

Related U.S. Application Data

(62) Division of application No. 13/403,713, filed on Feb. 23, 2012, now Pat. No. 9,822,757.

(60) Provisional application No. 61/445,931, filed on Feb. 23, 2011.

(51) Int. Cl.
*F03B 13/10* (2006.01)

(52) U.S. Cl.
CPC ........ *F03B 13/10* (2013.01); *F05B 2240/917* (2013.01); *F05B 2240/97* (2013.01); *Y02E 10/22* (2013.01)

(58) Field of Classification Search
USPC ...................................................... 340/850
See application file for complete search history.

(56) References Cited

U.S. PATENT DOCUMENTS

| 2,422,337 | A | 6/1947 | Chilowsky |
| 2,941,492 | A | 6/1960 | Wilcoxon |
| 3,024,757 | A | 3/1962 | Aschinger |
| 3,191,202 | A | 6/1965 | Handler |
| 3,590,635 | A | 7/1971 | Duing |
| 3,590,912 | A | 7/1971 | Elder et al. |
| 3,628,205 | A | 12/1971 | Starkey et al. |
| 3,688,730 | A | 9/1972 | Ortlieb |
| 3,818,523 | A | 6/1974 | Stillman, Jr. |
| 3,860,983 | A | 1/1975 | Furth et al. |
| 3,906,790 | A | 9/1975 | Brainard, II et al. |
| 3,971,251 | A | 7/1976 | Niskin |
| 3,936,895 | A | 12/1976 | Talkington |
| 4,177,530 | A | 12/1979 | Swenson |
| 4,189,786 | A | 2/1980 | Adler |
| 4,546,721 | A | 10/1985 | Langrock |
| 4,580,987 | A | 4/1986 | Walden |

(Continued)

*Primary Examiner* — Emily C Terrell
(74) *Attorney, Agent, or Firm* — Morse, Barnes-Brown & Pendleton, P.C.; Sean D. Detweiler, Esq.

(57) ABSTRACT

An underwater system for generating electricity can include a spool assembly configured to wind and unwind a retractable line. The system can include a controllable apparatus connected to the retractable line. The system can include a tension assembly connected to the spool assembly and configured to maintain a first tension in the retractable line. The system can include one or more surfaces connected to the apparatus and configured to produce a second tension in response to a current, the direction of the second tension being either opposite or equal to the direction of the first tension. The system can include an electrical generator assembly configured to generate electricity in response to unwinding the retractable line.

13 Claims, 12 Drawing Sheets

(56) References Cited

U.S. PATENT DOCUMENTS

| | | | |
|---|---|---|---|
| 4,924,698 A | | 5/1990 | Echert et al. |
| 4,947,782 A | | 8/1990 | Takahashi |
| 5,129,848 A | | 7/1992 | Etheridge et al. |
| 5,212,939 A | | 5/1993 | Pratt, Jr. |
| 5,642,330 A | | 6/1997 | Santopietro |
| 5,816,874 A | | 10/1998 | Juran et al. |
| 5,971,668 A | * | 10/1999 | Miller ................ A62B 35/0068 119/770 |
| 6,463,800 B2 | | 10/2002 | Fowler |
| 2003/0097778 A1 | | 5/2003 | Pippert |
| 2005/0285407 A1 | * | 12/2005 | Davis ...................... F03B 3/128 290/54 |
| 2007/0231072 A1 | * | 10/2007 | Jennings ................ F03B 13/10 405/75 |
| 2009/0149092 A1 | | 6/2009 | Jaber et al. |
| 2009/0209154 A1 | | 8/2009 | Lunde |
| 2010/0032949 A1 | * | 2/2010 | Varrichio .................. F03D 5/00 290/44 |
| 2010/0107627 A1 | * | 5/2010 | Morgan .................. B63B 35/44 60/495 |
| 2010/0185348 A1 | | 7/2010 | Webb |
| 2010/0197181 A1 | | 8/2010 | Wainman |
| 2010/0295302 A1 | * | 11/2010 | Martin .................... F03B 17/06 290/43 |
| 2010/0327583 A1 | * | 12/2010 | Hunt ....................... B63B 21/50 290/43 |
| 2010/0332041 A1 | * | 12/2010 | Hunt ....................... B63B 21/50 700/287 |
| 2011/0180667 A1 | * | 7/2011 | O'Brien ................ B64C 39/022 244/135 R |
| 2012/0212350 A1 | | 8/2012 | Magnell |

\* cited by examiner

UNDERWATER ENERGY GENERATING SYSTEM

RELATED APPLICATION

This application is a divisional of U.S. application Ser. No. 13/403,713, filed Feb. 23, 2012, which claims priority to U.S. Provisional Application No. 61/445,931, filed Feb. 23, 2011, for all subject matter disclosed. The disclosures of said applications are hereby incorporated by reference herein in their entirety.

FIELD OF THE INVENTION

The present invention relates to underwater submersible controllable apparatus suitable for a wide range of applications, and more particularly to an underwater tethered submersible controllable apparatus that with an electrical generator assembly can be configured to generate electricity in response to winding or unwinding of a retractable line tethered to the submersible controllable apparatus.

BACKGROUND OF THE INVENTION

Oceanography is an increasingly important field that contributes information useful to a wide variety of industries. Real-time telemetry from deepwater oceanographic current moorings is especially desirable for the offshore oil industry. Compared with traditional in-situ recording, telemetry of ocean current data allows immediate use of the information, continuous verification of sensor performance, and data security. For example, when an in-situ recording device is lost or irreparably damaged subsequent to collecting a substantial amount of data, the data is also lost. Such losses can be extremely costly, especially if data collection occurs infrequently.

While real-time telemetry from deepwater moorings has been attempted as an alternative to in-situ recordings, real-time telemetry is traditionally very difficult and expensive. Telemetry systems require radio transmission, and radio transmission must occur at the surface of the body of water. Much of the profiling and oceanographic data collection, on the other hand, occurs beneath the ocean surface at depths ranging from a few meters to full ocean depth (thousands of meters). Accordingly, existing systems often utilize an assembly of subsurface buoys and floats that span the desired measurement range from near the surface down to the ocean floor. Such systems also include a data link of some form, which relays information gathered by oceanographic sensors up to the one or more surface components.

However, one problem confronting existing real-time telemetry systems is that surface conditions are extremely harmful to the surface components. As a result, maintaining surface buoys/floats or powered station-keeping surface vehicles often requires excessive attention and resources. Marine biofouling and damage from wave action create a need for continual repairs and tend to involve heavy power consumption. The reliability and operational lifetime of such surface-dwelling telemetry buoys is extremely limited given these factors, and the work required to maintain such systems is burdensome and expensive.

Some attempts have been made to eliminate the need for anchored surface floats or surface stations from such oceanographic measurement assemblies. Recently, autonomous vehicles of various types have been proposed as alternatives to moored surface buoys. Autonomous Surface Vehicles (ASVs), such as long-duration, diesel-powered, boat-shaped vehicles have been offered. Subsurface Autonomous Underwater Vehicles (AUVs) exist that use storage batteries to provide propulsive power. Other subsurface options include winged Autonomous Underwater Vehicles (Gliders), which rely on battery-powered buoyancy changes and lifting surfaces ("wings") to provide forward propulsion.

However, all existing ASVs and AUVs suffer from very limited propulsive power, which makes them unable to remain in position for an indefinite period, to hold position in storms, or to swim against strong currents, such as the Gulf Loop Current and its eddies (4+ kt) in the Gulf of Mexico, which is just one example of a prime area where real-time current measurements are needed by the offshore oil industry. Furthermore, ASVs must remain at the surface where they are subject to biofouling and possible swamping/damage during storms or especially strong currents. Glider AUVs are extremely limited in power capacity and thus are not equipped to provide frequent real-time telemetry. Rather, they must spend a majority of their time propelling forward underwater, simply to remain on station. This forward propulsion occurs far from the subsurface moored current meters, making trips to the surface for telemetry virtually impossible during such conditions. Additionally, autonomous ocean vehicles are typically very expensive and can have high operational costs due to the required continual attention from skilled technical personnel.

Given the desirability of data collection in such harsh ocean environments, no existing telemetry platform meets the needs of the consumers and the demands of the environment.

SUMMARY

There is a need for a near-real time telemetry platform capable of maintaining desired positions in strong currents, while not suffering the vulnerability and cost disadvantages associated with surface-dwelling vehicles, moored buoys, ASVs, or AUVs. Additionally, there is a need for a telemetry platform having reduced battery power dependency. The present invention is directed toward further solutions to address these needs, in addition to having other desirable characteristics.

In accordance with an example embodiment of the present invention, a submersible telemetry system is provided. The submersible telemetry system includes a submersible telemetry platform. The submersible telemetry platform includes a body and at least one lift generating surface coupled to the body. The at least one lift generating surface is configured in such a way as to provide lift to the body when a fluid flows across the lift generating surface. At least one attitude control surface is coupled to the body and configured to control a pitch of the body in such a way as to modify the lift on the body between a negative lift and a positive lift. A control device is coupled to the at least one control surface and configured to control the at least one control surface. Telemetry equipment is coupled to the body and configured for wireless communication with at least one remote device. The submersible telemetry system further includes a base configured to be anchored at a subsurface location. A tether couples the body with the base in such a way that the body has complete freedom-of-movement about a common center point at the base. The telemetry platform is controllable to rise from an entirely submersed position within a body of liquid to a surfaced position at a surface of the body of liquid.

In accordance with further example embodiments of the present invention, a rotatable arm couples the base to the tether. The rotatable arm has freedom-of-movement about the common center point at the base. The base can include an anchored subsurface float or a dead weight seabed anchor. The telemetry platform further can include a swing arm coupling the body to the tether, and the swing arm can be configured to pivot about a pivot point situated in or on the body. The telemetry equipment can include a radio telemetry antenna for transmitting radio signals, an acoustic telemetry unit for receiving acoustic signals, or both. One or more vertical rudder fins can be coupled to the body for stabilizing the body. The body further can include an internal buoyancy module and a ballast compartment. The internal buoyancy module and the ballast compartment can be sized and positioned in such a way that the body has a net positive buoyancy. The submersible telemetry system further can include one or more of: a GPS relocation beacon, a flashing-light relocation beacon, an upward-looking acoustic Doppler current profiler, a downward-looking acoustic Doppler current profiler, and an acoustic modem with multiple inputs. The telemetry platform further can include one or more sensors coupled to the body. An electrically conducting slip-ring assembly can be coupled to the base for transmitting power, data, or both to the telemetry platform. The telemetry platform further can include an impeller coupled to the body at an end of the body configured to face downstream, and a rotating generator coupled to the impeller for generating electricity based on rotation of the impeller.

In accordance with further example embodiments of the present invention, the control device can be configured to operate in one or more of the following modes: (a) a submersed mode in which the control device controls an angle of the at least one control surface in a manner sufficient to maintain the telemetry platform at a substantially constant depth below the surface of the body of liquid; (b) a first transit mode in which the control device controls the at least one control surface in a manner sufficient to cause the telemetry platform to rise from the substantially constant depth to the surface of the body of liquid; (c) a surfaced mode in which the control device controls the at least one control surface in a manner sufficient to maintain the telemetry platform at the surface of the body of liquid for wireless communication with the at least one remote device; or (d) a second transit mode in which the control device controls the at least one control surface in a manner sufficient to cause the telemetry platform to descend from the surface of the body of liquid to the substantially constant depth below the surface of the body of liquid. For example, the control device can be configured to operate in all of the modes (a), (b), (c), and (d).

In accordance with an example embodiment of the present invention, an underwater system for generating electricity is provided. The underwater system can include a base for storing generated electricity. The base can include a spool assembly coupled to a retractable line and configured to wind and unwind the retractable line. A tension assembly can be coupled to the spool assembly and configured to maintain a first tension in the retractable line. An electrical generator assembly can be configured to generate electricity in response to winding or unwinding of the retractable line. The underwater system further can include a submersible controllable apparatus can be coupled to the retractable line. The submersible controllable apparatus can include a body, one or more surfaces coupled to the body and configured to produce a controllable second tension in the retractable line in response to a current. The second tension can have a direction that is modifiable between being either opposite or equal to the direction of the first tension. The submersible controllable apparatus further can include a controller coupled to the one or more surfaces for controlling the one or more surfaces in a manner sufficient to control the controllable second tension.

In accordance with further example embodiments of the present invention, the one or more surfaces can include at least one lift generating surface coupled to the body and configured in such a way as to provide lift to the body when a fluid flows across the lift generating surface. At least one control surface can be coupled to the body and configured to control a pitch of the body in such a way as to modify the lift characteristics of on the body between a negative lift and a positive lift. The controllable apparatus further can include telemetry equipment coupled to the body and configured for wireless communication with at least one remote device. The base further can include one or more sensors. The controllable apparatus can include a controller coupled to the one or more surfaces and configured to control the one or more surfaces.

In accordance with further example embodiments of the present invention, the controller can be configured to operate in one or more of the following modes: (a) a submersed mode in which the controller controls the one or more surfaces in a manner sufficient to maintain the controllable apparatus at a substantially constant depth below a surface of a body of liquid; (b) a first transit mode in which the controller controls the one or more surfaces in a manner sufficient to cause the controllable apparatus to rise from the substantially constant depth to the surface of the body of liquid; (c) a surfaced mode in which the controller controls the one or more surfaces in a manner sufficient to maintain the controllable apparatus at the surface of the body of liquid; or (d) a second transit mode in which the controller controls the one or more surfaces in a manner sufficient to cause the controllable apparatus to descend from the surface of the body of liquid to the substantially constant depth below the surface of the body of liquid.

In accordance with further example embodiments of the present invention, a method of operating a telemetry system is provided. The method can include providing a submersible telemetry platform. The submersible telemetry platform can include a body and at least one lift generating surface coupled to the body and configured in such a way as to provide lift to the body when a fluid flows across the lift generating surface. At least one attitude control surface can be coupled to the body and configured to control a pitch of the body in such a way as to modify the lift on the body between a negative lift and a positive lift. A control device can be coupled to the at least one control surface and configured to control the at least one control surface. Telemetry equipment can be coupled to the body and configured for wireless communication with at least one remote device. Additionally, a base can be provided, and the base can be configured to be anchored at a subsurface location. A tether can be provided, and the tether can couple the body with the base in such a way that the body has complete freedom-of-movement about a common center point at the base. The telemetry platform can be caused to rise from an entirely submersed position within a body of liquid to a surfaced position at a surface of the body of liquid.

In accordance with further example embodiments of the present invention, the step of causing the telemetry platform to rise from the entirely submersed position within the body of liquid to the surface position at the surface of the body of liquid can include controlling the one or more attitude control surfaces in a manner sufficient to cause the controllable apparatus to rise from the substantially constant depth to the surface of the body of liquid. Once the telemetry platform reaches the surface position, the telemetry platform can engage in data transmission with the at least one remote device. The telemetry platform can be caused to descend from the surfaced position to a substantially constant depth below the surface of the body of liquid.

In accordance with embodiments of the present invention, a submersible telemetry system can include a body. The system can include at least one lift-generating surface configured in such a way as to provide lift to the body when a fluid flows across the lift-generating surface. The system can include at least one control surface configured to control a pitch of the body in such a way as to modify lift characteristics of the body between a negative lift and a positive lift. The system can include a control device disposed to control the at least one control surface. The system can include a base configured to be anchored to a subsurface location. The system can include a tether coupling the body with the base in such a way that the body has complete freedom-of-movement about a common center point at the base. The system can include telemetry equipment supported by the body and suitable for wireless communication with remote devices. The body can be controllable to rise to a surface of a liquid within which the body is submersed. The system can be entirely submersible beneath a surface of a liquid within which it is submersed.

In accordance with further aspects of the present invention, the system can include a joint coupling a rotatable arm to the base and providing the rotatable arm with freedom-of-movement about the common center point at the base. The tether can couple the body with the base by coupling to the rotatable arm. The anchored base can include an anchored subsurface float. The joint can be a spheroidal joint.

In accordance with additional embodiments of the present invention, an underwater system for generating electricity can include a spool assembly configured to wind and unwind a retractable line. The system can include a controllable apparatus connected to the retractable line. The system can include a tension assembly connected to the spool assembly and configured to maintain a first tension in the retractable line. The system can include one or more surfaces connected to the apparatus and configured to produce a second tension in response to a current, the direction of the second tension being either opposite or equal to the direction of the first tension. The system can include an electrical generator assembly configured to generate electricity in response to unwinding the retractable line.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1A:
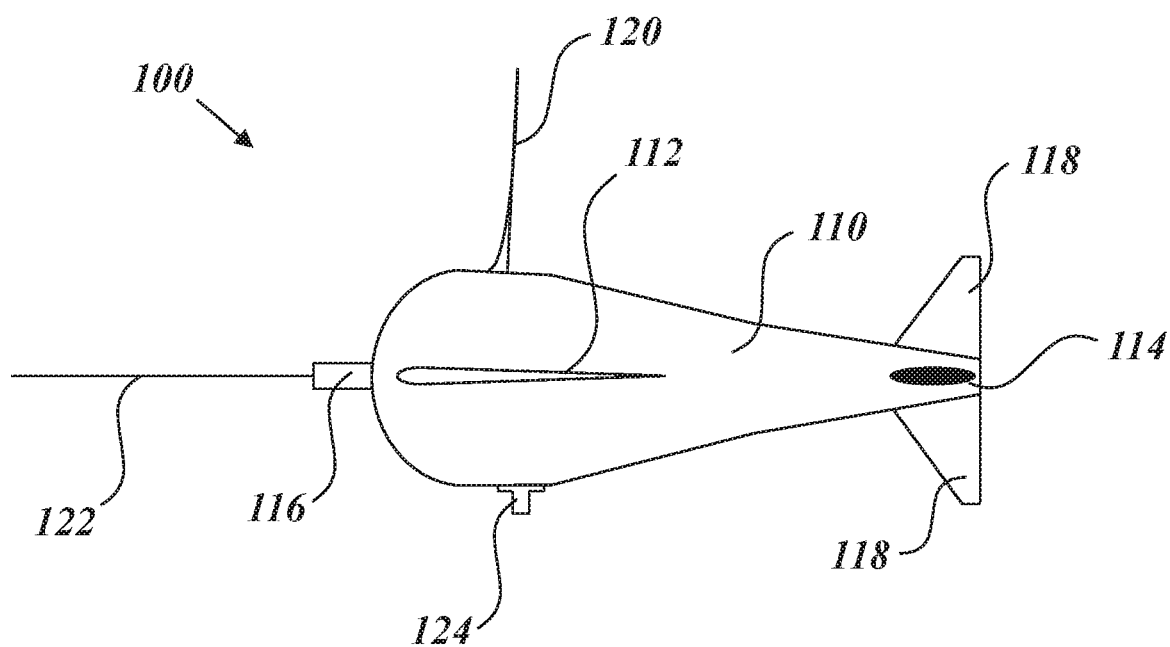
FIG. 1A is a diagrammatic illustration of a submersible telemetry platform shown from the side according to embodiments of the present invention.

An illustrative embodiment of the present invention relates to a system, apparatus, and method for operating a submersible radio data telemetry platform for oceanographic moorings that overcomes the most serious drawbacks of traditional surface moorings. The illustrative telemetry platform provides near-real-time radio or satellite transfer of data while permitting a majority of its time to be spent substantially below the surface of water. The telemetry platform includes a streamlined towbody that is tautly tethered to, and receives data from, a subsurface mooring assembly containing oceanographic sensors. The telemetry platform has two configurations, submersed mode and surfaced mode. By utilizing the two configurations, the improved telemetry platform can rise to the surface at desired times to transmit and/or receive data, thereby altogether eliminating a need for any type of surface mooring or powered-station keeping surface vehicle.

When submersed, the telemetry platform can receive oceanographic and other data from the subsurface mooring assembly. The telemetry platform is preferably submersed substantially below the ocean surface, in a relatively safe environment free from marine biofouling and wave action. In the submersed position, the streamlined shape of the telemetry platform can result in low drag forces acting on the subsurface mooring, even in high currents. Upon adjusting the ramp angle of attitude control surfaces located on the telemetry platform, the telemetry platform can use the flow of water to generate sufficient dynamic lift to overcome the natural tension in the tether and rise to the surface, thereby initiating surfaced configuration.

Notably, the telemetry platform can rise to the surface with minimal power consumption. In particular, the power consumption can be limited to that which is necessary to activate the attitude control surfaces. The improved telemetry platform manipulates the flow of water across the device to generate sufficient dynamic lift, which greatly reduces dependency on buoyancy or battery power to provide the force necessary to rise to the surface. Additionally, the surfaced mode comprises brief intermittent periods of data transfer between long periods of data collection. Eliminating unnecessary dwell time at the ocean surface minimizes external deterioration of the telemetry platform. This ultimately allows for reduced vulnerability to damage and lower maintenance expense, while still permitting frequent trips to the surface and near real-time data telemetry.

FIGS. 1 through 8B, wherein like parts are designated by like reference numerals throughout, illustrate example embodiments of a near-real time telemetry platform according to the present invention. Although the present invention will be described with reference to the example embodiments illustrated in the figures, it should be understood that many alternative forms can embody the present invention. One of skill in the art will additionally appreciate different ways to alter the parameters of the embodiments disclosed, such as the size, shape, or type of elements or materials, in a manner still in keeping with the spirit and scope of the present invention.

Figure 1B:
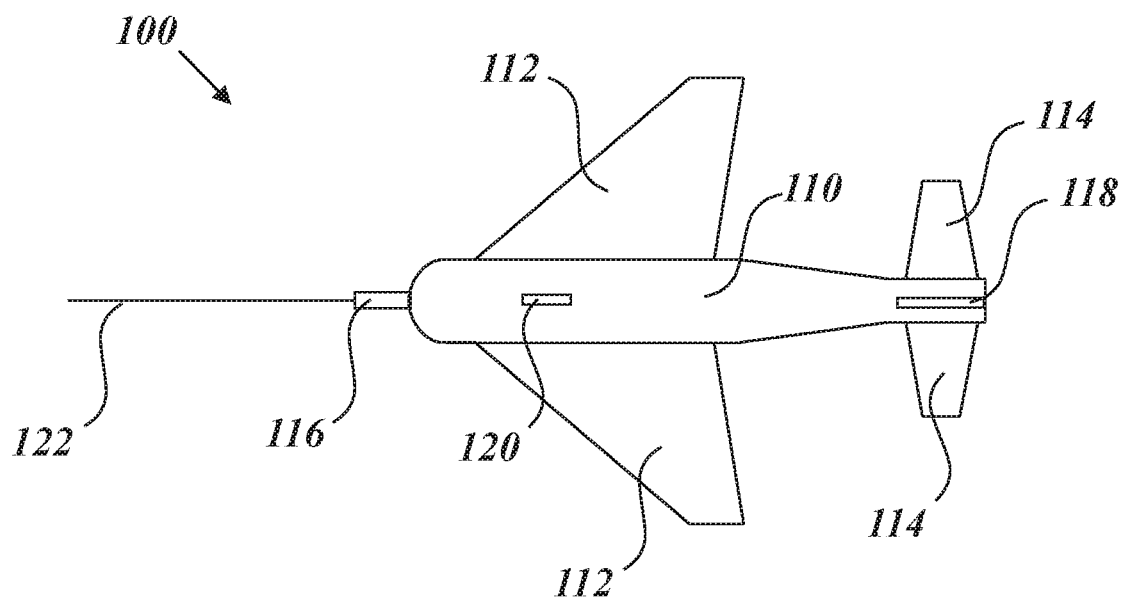
FIG. 1B is a diagrammatic illustration of a submersible telemetry platform shown from the top according to example embodiments of the present invention.

FIG. 1A depicts a side view of the illustrative telemetry platform 100 according to embodiments of the present invention. FIG. 1B illustrates a top view of the telemetry platform 100. The telemetry platform 100 includes a towbody 110, which is preferably streamlined (e.g., has a foil shape that reduces drag). Fixedly attached at each side of the towbody 110 are lift-generating surfaces 112. In illustrative embodiments, the lift-generating surfaces 112 not configured to rotate with respect to the towbody 110. At the tail (i.e., the rightmost portion in FIG. 1A) of the towbody 110, two attitude control surfaces 114 are attached. The attitude control surfaces 114 are configured to have an adjustable ramp angle with respect to the towbody 110. As described in further detail herein, in the presence of a current or flowing water, tilting the attitude control surfaces 114 with respect to towbody 110 results in a change in the telemetry platform 100's pitch. Adjusting the pitch causes the lift-generating surfaces 112 to generate a positive or negative lift, which increases or decreases the depth of the platform 100. Thus, controlling the attitude control surfaces 114 enables manipulation of the platform 100's depth, as described in greater detail herein.

A "towbody" herein refers to any attached body that is configured to be in the presence of flowing fluid. A "towbody" therefore includes both any attached apparatus configured to be dragged through water (or another liquid) and any attached apparatus configured to maintain a fixed position as water (or another liquid) flows past it.

Continuing with FIGS. 1A and 1B, the platform 100 also includes two fixed vertical rudder fins 118 attached at the tail of the towbody 110, which help to keep the platform 100 oriented in the direction of a current, and which also stabilize yaw (rotation around a vertical axis) of the telemetry platform 100 when subjected to a current. The towbody 110 also includes data telemetry equipment sufficient to enable telemetric communication with at least one remote source, such as a radio telemetry antenna 120 and an acoustic telemetry unit 124. The radio telemetry antenna 120 is configured to transmit radio signals for radio or satellite telemetry and communication, and the acoustic telemetry unit 124 is configured to receive acoustic signals, as understood by one having skill in the art. For example, radio telemetry equipment for use in ocean areas remote from shore-based receiving stations could include (but not be limited to) well known satellite telemetry systems manufactured by companies such as Iridium Communications Inc. (headquartered in McLean, Va.), Globalstar LLC (headquartered in Covington, La.), and the like. Telemetry systems for use closer to shore, where cellular telephone service exists, could for example utilize GPRS (General Packet Radio Service) systems or other telemetry systems based on existing land-based cellular telephony. Alternatively, direct radio telemetry systems, such as spread-spectrum radio modems, could be used where dedicated receiving facilities exist within radio range of the telemetry platform.

Figure 2:
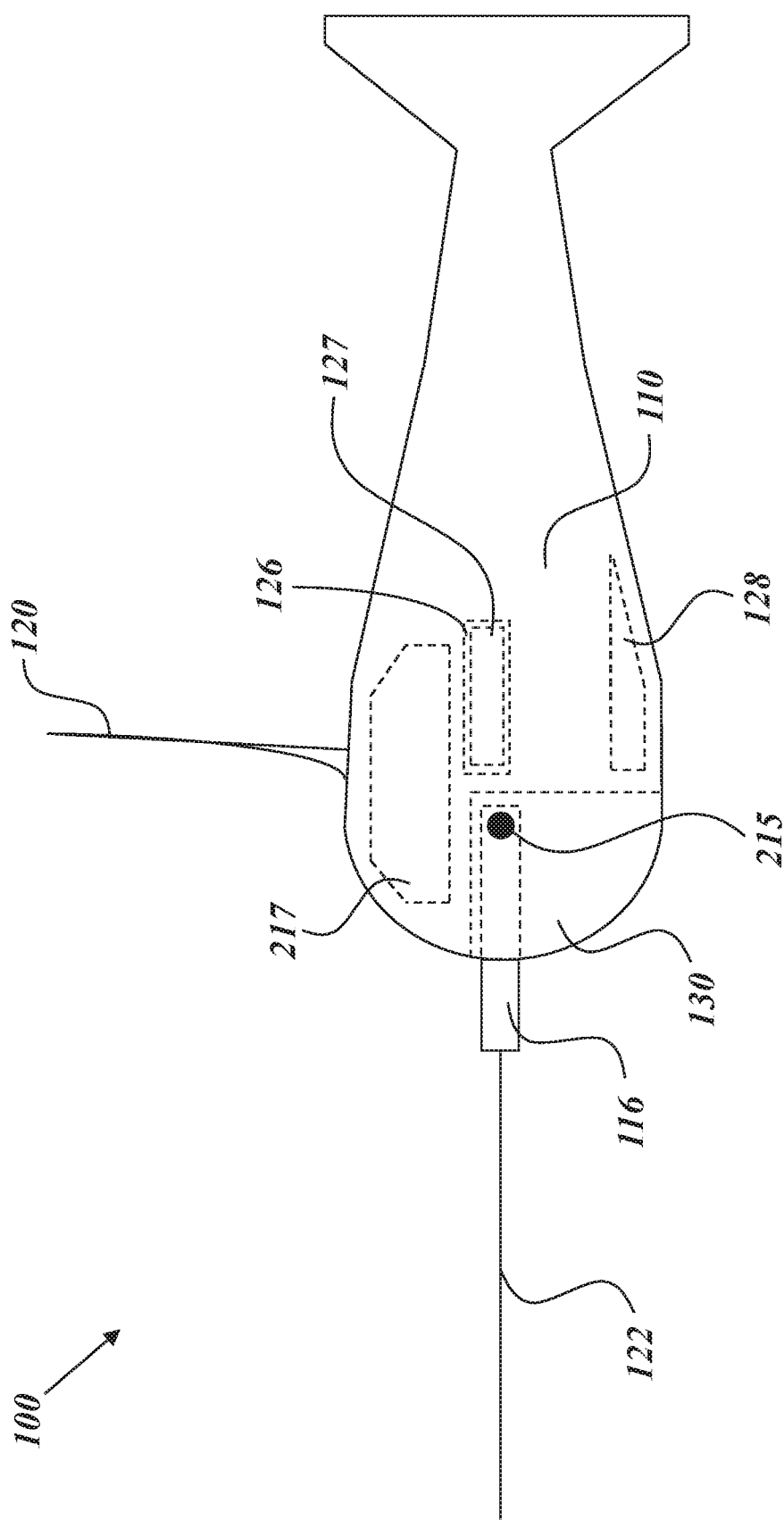
FIG. 2 is a diagrammatic illustration of a submersible telemetry platform shown from the side and further depicting inner compartments according to aspects of the present invention.
Figure 5:
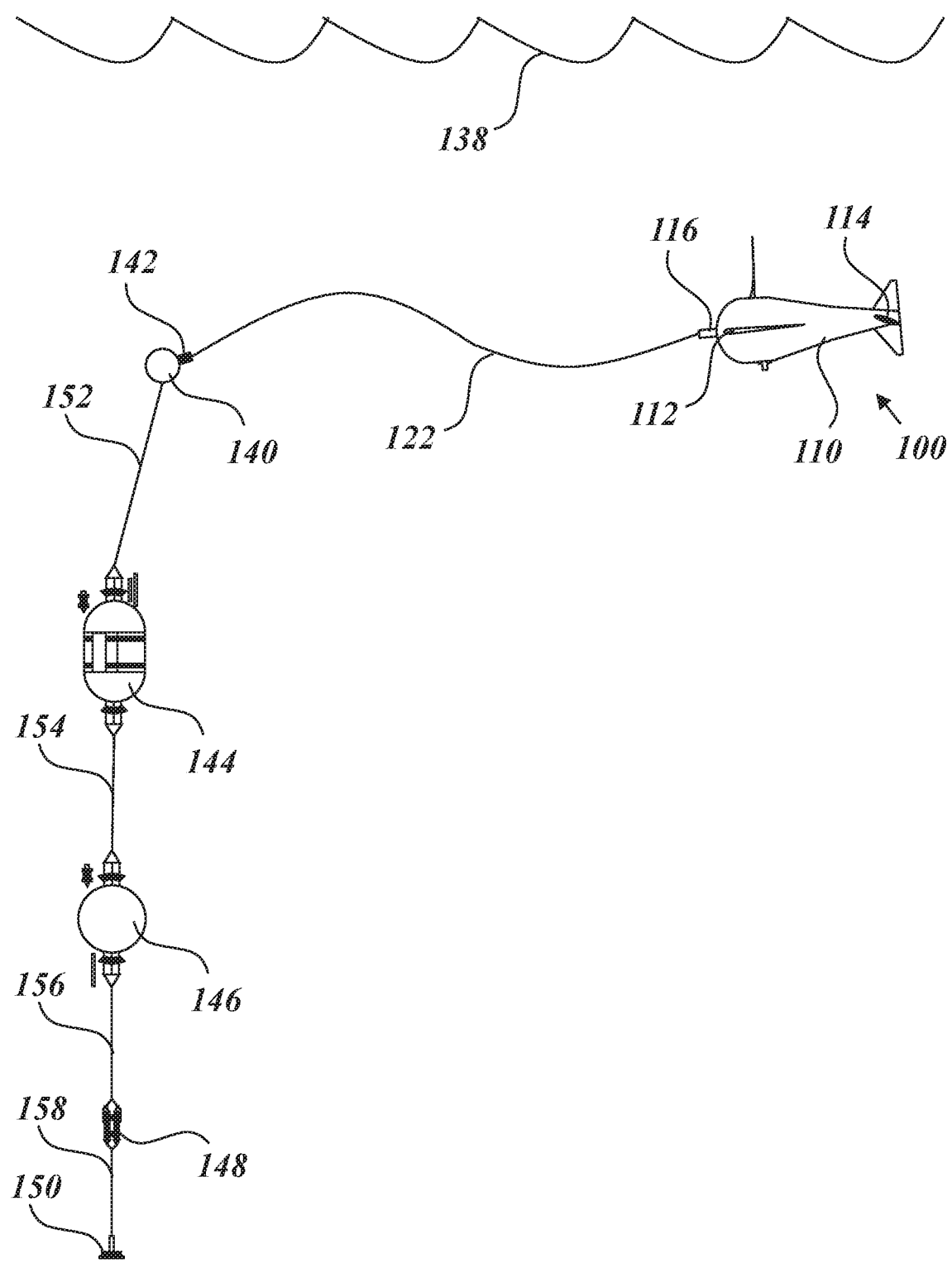
FIG. 5 is a diagrammatic illustration of a submersible telemetry system having a submersed configuration in an example underwater environment according to aspects of the present invention.
Figure 6:
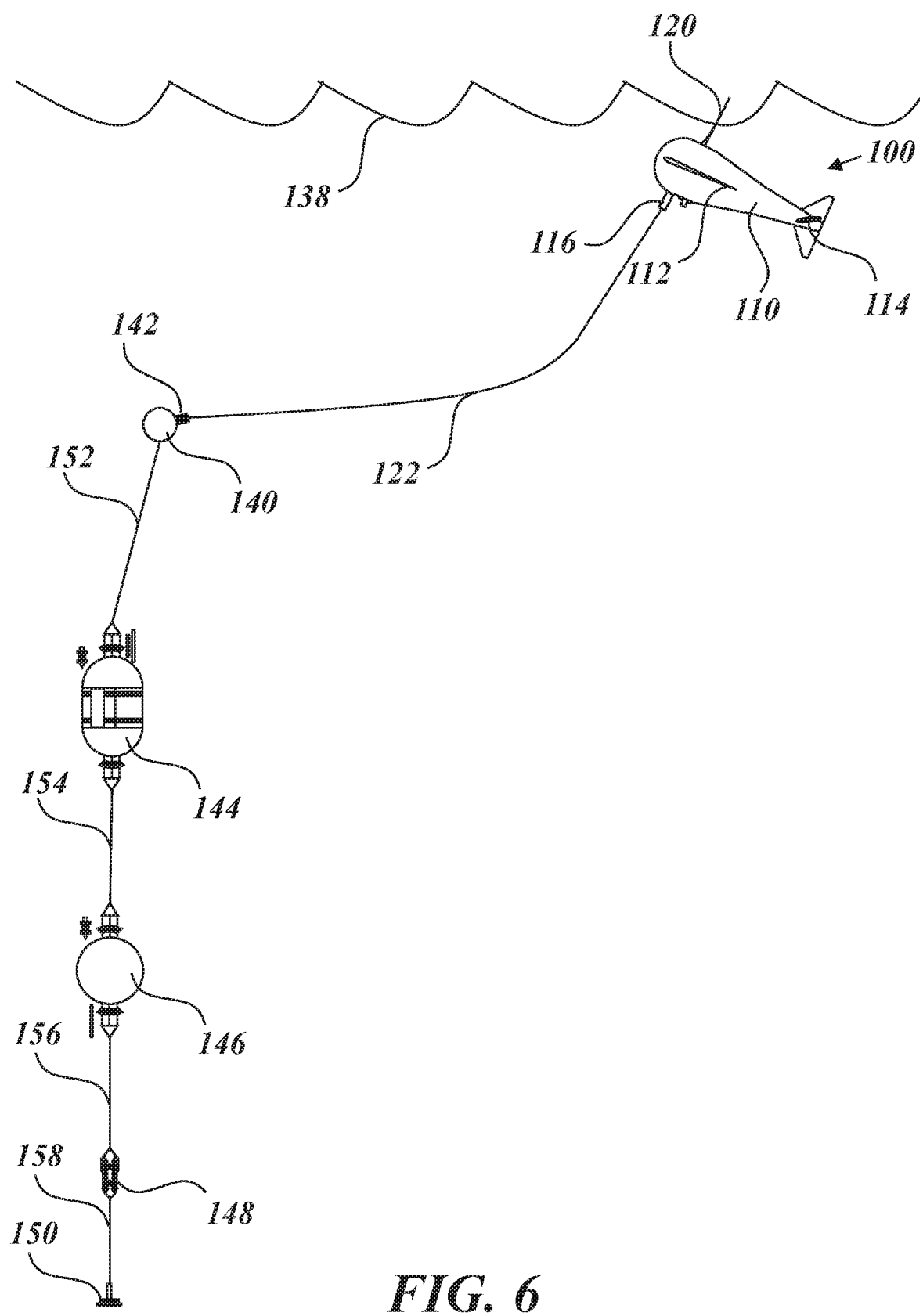
FIG. 6 is a diagrammatic illustration of a submersible telemetry system having a surfaced configuration in an example underwater environment according to aspects of the present invention.
Figure 7:
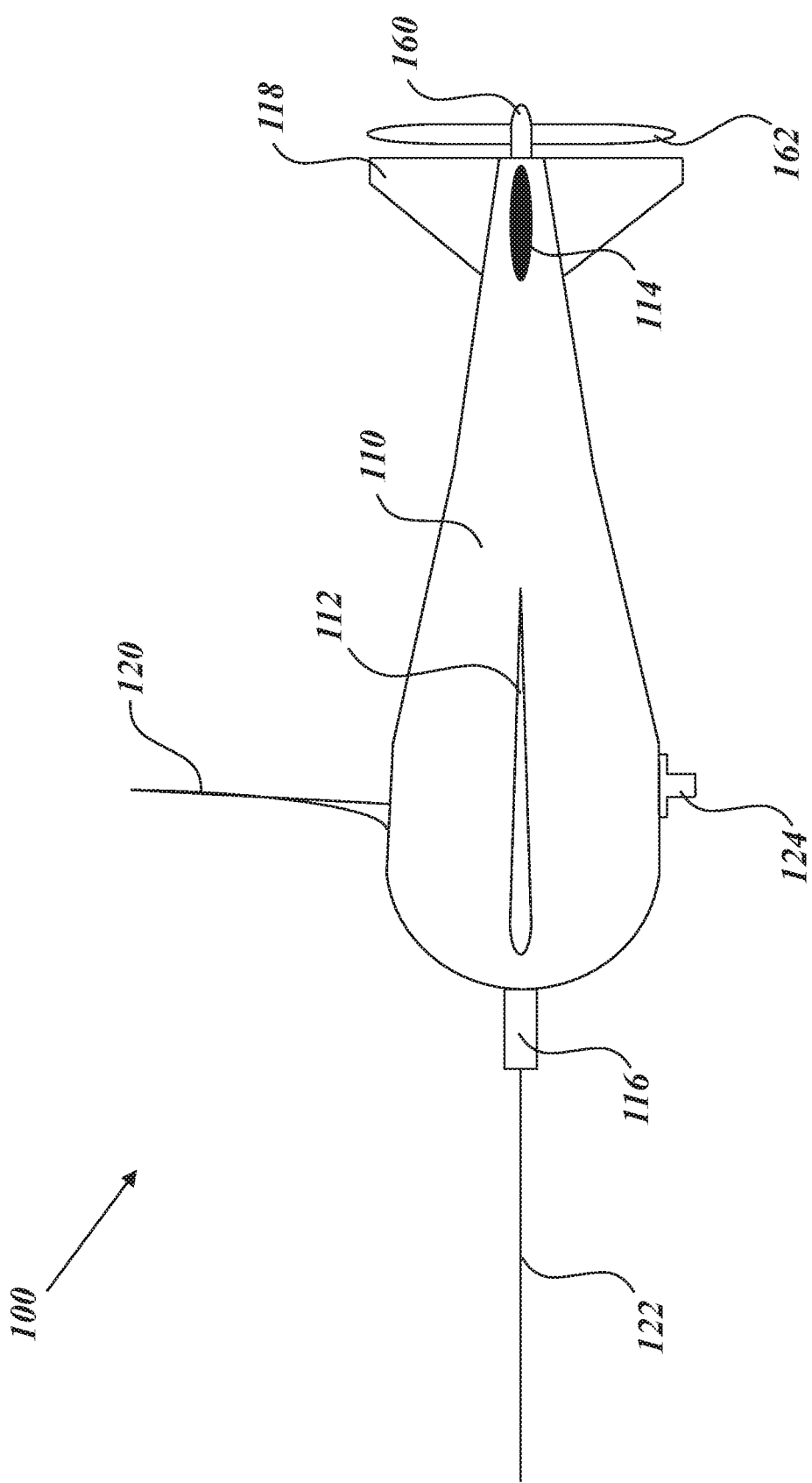
FIG. 7 is a diagrammatic illustration of a submersible telemetry platform having an impeller to rotate an electricity generator according to alternate embodiments of the present invention.

Coupled to the towbody 110 at a position proximate the nose is a tether swing attachment arm 116. The tether swing attachment arm 116 is preferably connected to a pivot point 215 on the towbody 110, such that the tether swing attachment arm 116 is allowed to swing within a defined slot-shaped cavity 130 located within and extending to the nose of the towbody 110. As depicted in FIG. 2, the range of motion of the tether swing attachment arm 116 can be confined to a single angular dimension. In the example embodiment of FIGS. 1 through 4, the pivot point 215 is located beneath the lift-generating surfaces 112 and slightly forward of the center of lifting force when the telemetry platform 100 is in the surfaced mode. By use of such a tether swing attachment arm 116, the towing point is in an appropriate position underneath the lift-generating surfaces 112 to receive the upward force when the platform 100 is in surfaced mode, whereas the towing point moves to the front of the telemetry platform 100 when the platform 100 is in the low-drag, submersed mode. Notably, the tether swing attachment arm 116 can permit the platform to tow stably in both the surfaced and submersed modes of operation. The cavity 130 and pivot point 215 are shown in FIG. 2, along with other internal compartments. At its distal (e.g., exposed) end extending away from the pivot point 215, the tether swing attachment arm 116 is connected to a tether 122, which can anchor the telemetry platform 100 to a base float 140 when used in a deep-sea underwater environment. (The base float 140 is shown in FIGS. 5 and 6 and described in further detail herein.)

The towbody 110 can include various internal compartments, which are depicted by dotted lines in FIG. 2. In addition to the swing arm cavity 130, there is an electronic control unit compartment 126, which houses an electronic control unit 127. The electronic control unit 127 can include, for example, a plurality of actuators, circuitry, and other electronic equipment sufficient for performing the various desired functions (e.g., collecting data, controlling operational mode of the telemetry platform 100, etc.). In particular, in illustrative embodiments, the electronic control unit 127 includes an electrically-driven actuating mechanism that controls the ramp angle of the attitude control surfaces 114. In addition to electronic equipment for controlling the ramp angle of the attitude control surfaces 114, the electronic control unit 127 also can be configured to store, buffer, and recall data received from the subsurface mooring assembly. Preferably, a computer data acquisition system (DAS) is included in the electronic control unit 127 and configured to receive oceanographic data from the acoustic telemetry unit 124 and to store (buffer) the data for later telemetry to at least one remote device (e.g., located ashore). In some embodiments, the DAS adds additional data into the buffer, such as data about the telemetry platform 100 or its conditions (e.g., battery voltage, depth, pressure, attitude, pitch, roll, heading, etc.) and/or data gathered from optional oceanographic sensors included in the telemetry platform 100.

The electronic control unit 127 preferably contains a programmable feature that enables a fully-automated schedule for data transmission. For example, using the electronic control unit 127, the telemetry platform 100 can be programmed to automatically cause the telemetry platform 100 to rise to the surface of the body of water (or other liquid) in which it is situated at specific, predetermined times for engaging in radio or satellite telemetry. Alternatively or additionally, the electronic control unit 127 can be configured to automatically control the telemetry platform 100 to rise to the surface of a body of liquid after collecting a predetermined amount of data. One of skill in the art will appreciate yet other ways that the electronic control unit 127 can be configured to provide the telemetry platform 100 to engage in data transmission.

One having skill in the art will appreciate a wide variety of possible functions can be added in addition to or alternate to the functions described in detail herein. The electronic control unit 127 can also be configured to enable these functions as well. Embodiments of the present invention are not limited to the specific functions described in detail with respect to the illustrative embodiments.

The towbody 110 further can include an internal buoyancy module 217 and a ballast compartment 128 which, in the example embodiment of FIGS. 1 through 4, are distributed in such a way that the towbody 110 has a small net positive buoyancy. In addition, the internal buoyancy module 217 and the ballast compartment 128 can be positioned within the towbody 110 in such a way that the telemetry platform 100 tends to float upright in a vertically stable attitude, thereby enabling the telemetry antenna 120 to always point upward. The small net positive buoyancy can be useful, for example, in permitting the towbody 110 to naturally float to a surface of a body of water in the absence of a substantial current. The gravitationally stable attitude of the platform 100 can be useful, for example, in ensuring that the lift-generating surfaces 112 remain generally horizontal so that the platform 100 will rise toward the surface when a current is present and the attitude control surfaces 114 are tilted to cause the towbody 110 to have a nose-upward pitch. The ballast compartment 128 also preferably houses a battery unit for providing electrical power, e.g., to the electronic control unit 127 and any other electrically powered equipment.

The illustrative telemetry platform is connected via a tether 122 to a subsurface mooring assembly. In the illustrative embodiment the tether 122 is constructed of ropes or wires of differing densities, or it is otherwise ballasted, such that it attains an S-shape in the water and is slightly buoyant. The S-shape and slight buoyancy can be useful, e.g., in preventing entanglement of the tether 122 during static water conditions. The tether 122 is designed to have the smallest operable diameter, as would be understood by one of skill in the art, in order to minimize drag on the tether 122 during motion or under the presence of a current.

Figure 3A:
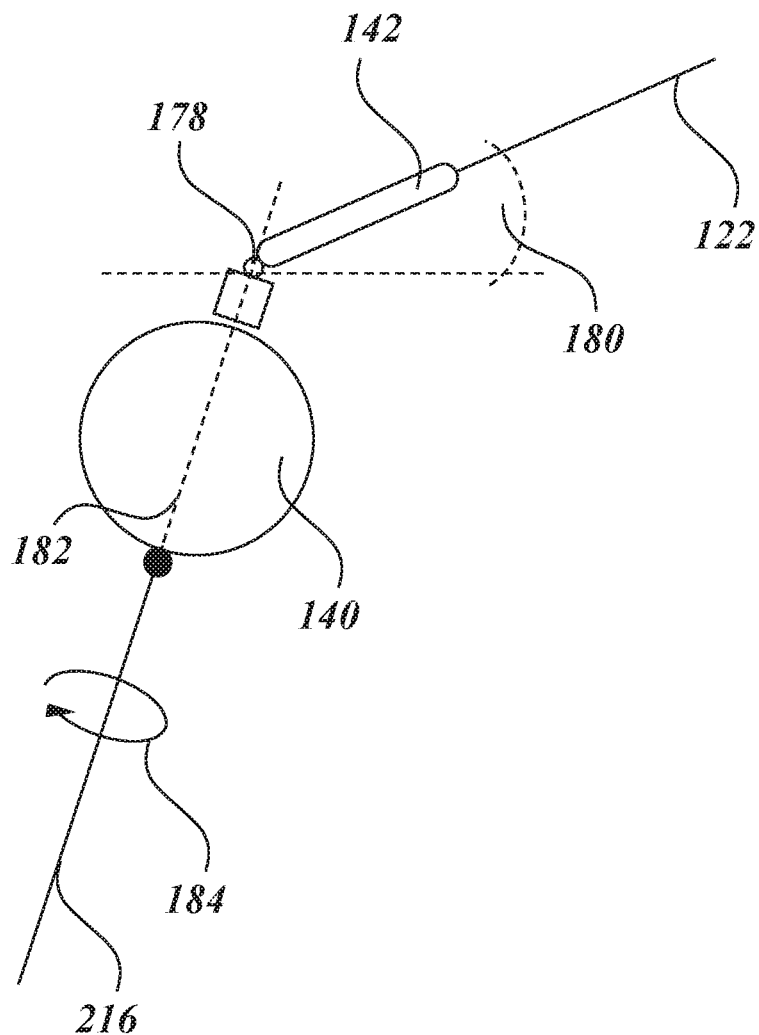
FIG. 3A is a diagrammatic illustration of an underwater base according to aspects of the present invention.
Figure 3B:
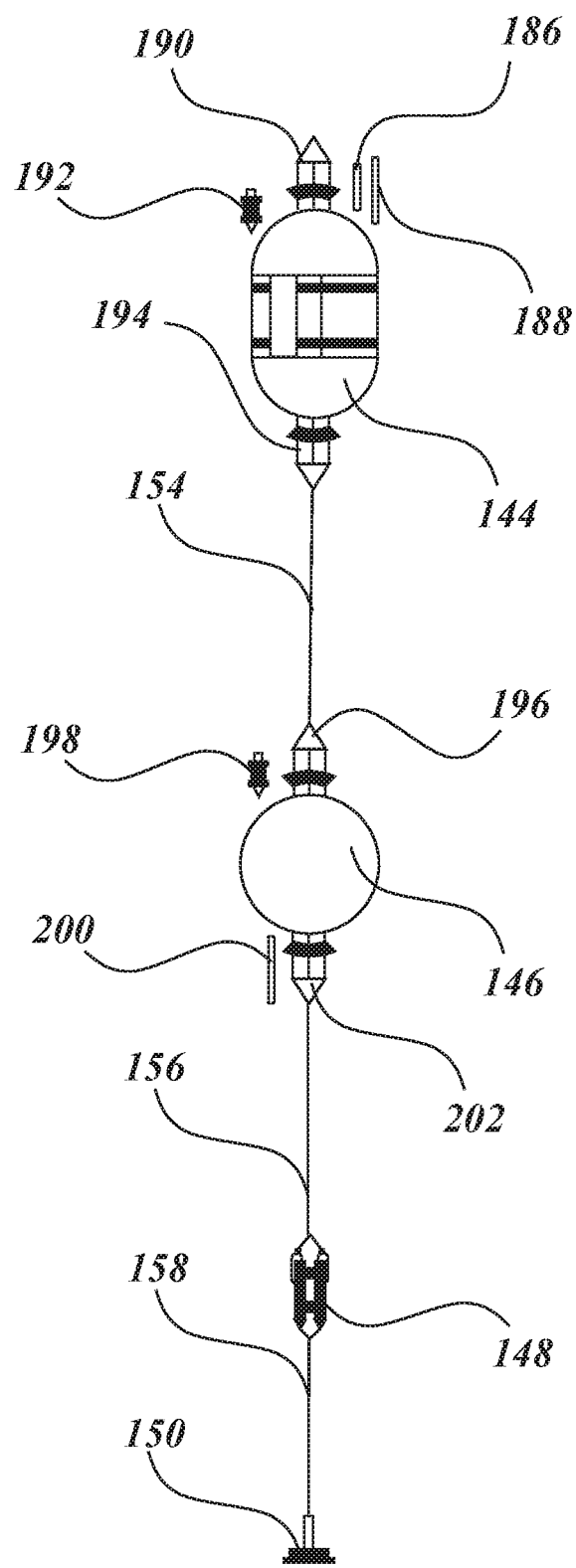
FIG. 3B is a diagrammatic illustration of an underwater mooring assembly according to aspects of the present invention.

The subsurface mooring assembly (to which the telemetry platform 100 can be coupled) can contain a variety of well-known underwater buoys, mooring components, oceanographic data collectors, tethers, and other known subsurface components. Some example underwater components are illustrated in FIGS. 3A and 3B. In particular, the subsurface mooring assembly can include a base 140. The base 140, in accordance with one example embodiment, is a buoy or float that remains at a substantially fixed depth and provides a subsurface anchor for the telemetry platform 100. Additionally, the base 140 can comprise an assembly of multiple base components. The base 140 is located far enough below the surface of the ocean to avoid biofouling, wave action, and other potentially damaging conditions. In illustrative embodiments, the base 140 is configured to be situated roughly one hundred meters below the ocean surface. In an alternative embodiment, the base 140 can be a fixed structure located on the ocean floor (e.g., not a buoy or float). Additionally, the base 140 is equipped with a load-bearing swivel 178 or other spheroidal joint, and a rotating arm 142 that can move azimuthally so as to change the angle 180 that is swept out by the rotating arm 142. The load-bearing swivel 178 provides freedom for the rotating arm 142 to rotate about axis 182 in a forward or reverse direction with arrow 184. Accordingly, the rotating arm 142 has freedom-of-movement in azimuthal and vertical planes around a common center point at the base, such that the rotating arm 142 always remains oriented parallel to the tether 122.

Alternatively, any other suitable base can be used in place of the base 140. Furthermore, the base 140 can be equipped with other features providing additional desired functionality. For example, the base 140 can include an electrically conducting slip-ring assembly, together with an electromechanical tether cable, to permit power and data to be transmitted between the subsurface mooring assembly and the telemetry platform 100. This can be useful, e.g., in reducing the need for positioning telemetry equipment, batteries, or other power storage or data receiving devices within/on the telemetry platform 100, thereby permitting alternate embodiments to have reduced weight, among other beneficial characteristics. Accordingly, these and other modifications are possible and contemplated within the scope of the present invention. The present invention is not limited to the specific examples provided herein, which are described for purposes of clarity and illustration.

The base 140 is preferably anchored by a mooring line 216 (the upper end of which is shown in FIG. 3A) to a subsurface oceanographic mooring (FIG. 3B) containing ocean measuring instrumentation and equipment to transmit oceanographic data to the telemetry platform. In an illustrative example, the oceanographic mooring would have an uppermost float 144, which is preferably located at a depth of roughly 450 meters below the ocean surface in accordance with one example implementation. As an example, the subsurface float 144 can be made by any number of a variety of suitable materials that are known to those with skill in the art. For example, the subsurface float 144 can be made from syntactic foam, and it can measure about 65 inches in diameter and about 100 inches in length. A variety of conventional and well-known profiling technology and other oceanographic equipment can be operationally coupled to the float 144 by one skilled in the art. For example, such equipment may include a GPS or Iridium relocation beacon 186, flashing-light relocation beacon 188, upward-looking and downward-looking Acoustic Doppler Current Profilers (ADCPs) 190 and 194, respectively, and an acoustic modem 192 with multiple inputs. The subsurface float 144 is preferably anchored by a wire rope 154 to a second subsurface float 146. The second subsurface float 146 similarly can be made from syntactic foam and can be operationally coupled to a variety of oceanographic or underwater equipment. Such equipment may include, by way of example, upward-looking and downward-looking ADCPs 196 and 202, respectively, acoustic modem 198, and flashing relocation beacon 200. The second subsurface float 146 is preferably anchored by wire rope 156 to dual acoustic release 148, which is in turn connected by a chain 158 to a dead weight seabed anchor 150.

As described in further detail herein, the subsurface mooring assembly can be specifically equipped to perform a variety of functions, including oceanographic profiling and transmission of acquired data to the telemetry platform 100. Given that the particular equipment and subsurface mooring assembly depends on the desired functions and intended applications of the telemetry platform, the equipment depicted in the figures and described herein is intended to be illustrative. In no way are embodiments of the present invention limited to such illustrative choices. One of skill in the art will readily appreciate many possible variations and assemblies, upon reading the present specification. All such variations and assemblies are contemplated within the scope of the present invention.

The manner in which the illustrative telemetry platform 100 operates will now be described. In ocean and river environments, it is uncommon that the telemetry platform 100 would not be subjected to a current. However, in instances where conditions are static and there is no current, the telemetry platform 100 naturally begins to rise due to its own buoyancy. This natural buoyancy of the telemetry platform 100 maintains tautness in the tether 122, thereby preventing its entanglement, even in the absence of a current. It also permits data telemetry when the platform 100 is at the surface of the water, even when in the absence of a current having a substantial water velocity.

More frequently, the telemetry platform 100 operates under the presence of a current. By exercising control over the various elements and components described herein, the telemetry platform 100 is uniquely equipped and configured to transfer the flow of water (or other liquid) from the current into a positive or negative dynamic lift that can be used to manipulate the depth at which the telemetry platform 100 is located. As oncoming water (or other liquid) flows toward the telemetry platform 100, the platform 100 can adjust its attitude control surfaces 114 such that the attitude control surfaces 114 are angled upward, angled downward, or at zero pitch. Furthermore, the particular angle can also be directed in a way that controls the specific quantity of upward or downward force that is applied as a result of the angle.

Figure 4A:
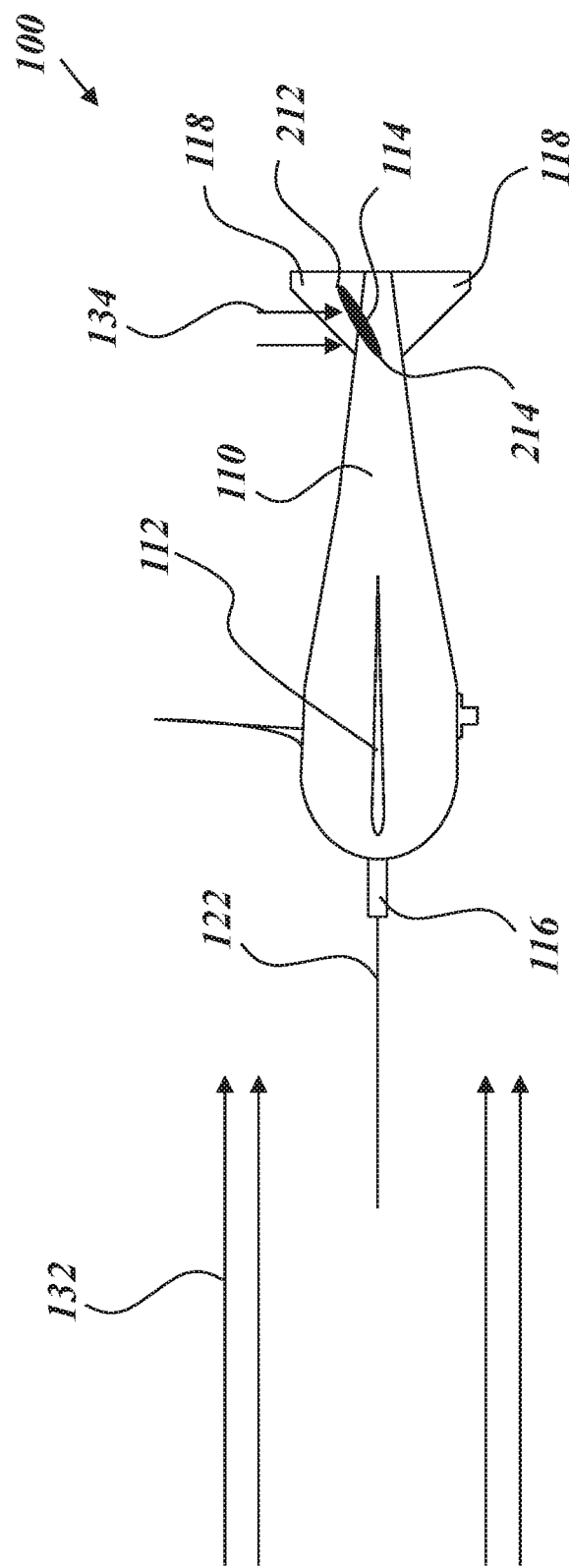
FIG. 4A is a diagrammatic illustration of a submersible telemetry platform shown from the side and maintaining a low-drag orientation according to aspects of the present invention.

An example scenario demonstrating these effects is shown in FIG. 4A. In this example, the attitude control surfaces 114 are angled upward with respect to the direction of water flow 132. Said differently, the rear edges of the control surfaces 114 are raised. Following with traditional conventions and when referring to attitude control surfaces 114, the terms "raised," "angled upward," and other similar terms are herein defined to mean that back ends 212 (i.e., proximate the tail of the towbody 110) of the attitude control surfaces 114 are higher than front ends 214 (i.e., proximate the nose of the towbody 110) of the attitude control surfaces 114. "Angled downward" or "lowered," on the other hand, indicates that the back ends 212 are lower than the front ends 214. When the attitude control surfaces 114 are angled upward, fluid traveling over the attitude control surfaces 114 moves slower than fluid traveling under the attitude control surfaces 114. This generates a downward or negative lift at the tail of the telemetry platform 100 that is not matched by a corresponding downward lift at the nose of the telemetry platform 100. Thus, pitching up the attitude control surfaces 114 produces an unbalanced downward force 134 at the tail. The downward force 134 causes rotational motion around the telemetry platform 100's pivot point 215, resulting in the nose of the telemetry platform 100 pitching up.

As the nose of the telemetry platform 100 pitches up, it can eventually reach an equilibrium state. This equilibrium pitch is achieved when sufficient rotational motion has occurred so as to produce a balance of torques acting on the pivot point 215. As would be appreciated by one of skill in the art, equilibrium occurs when a balance is achieved between a) the torque on the platform 100 around the horizontal axis of the pivot point 215 (i.e., the axis passing into the page at the pivot point 215 in FIG. 4A) due to the upward lifting force associated with the flow of current over the lift-generating surfaces 112 (this torque would be counter-clockwise in FIG. 4A since the center of lift force is behind the pivot point 215, tending to cause the nose of the towbody 110 to drop); and b) the opposing clockwise torque due to the downward force associated with water flow over the control surfaces 114, which would tend to cause the nose to rise.

In illustrative embodiments, the aforementioned equilibrium is achieved because the pivot point 215 of the tether swing attachment arm 116 attached to the tether 122 is located slightly ahead of (forward of) the center of lift of the lift-generating surfaces 112, while the center of downward lift associated with the attitude control surfaces 114 is located well aft. Accordingly, in relatively constant water conditions (e.g., constant current velocity), the attitude control surfaces 114 can be maintained at a substantially constant angle to provide a steady nonzero pitch, causing constant lift to be generated by the lift-generating surfaces 112 operating at a steady angle of attack relative to the ambient horizontal water velocity.

Figure 4B:
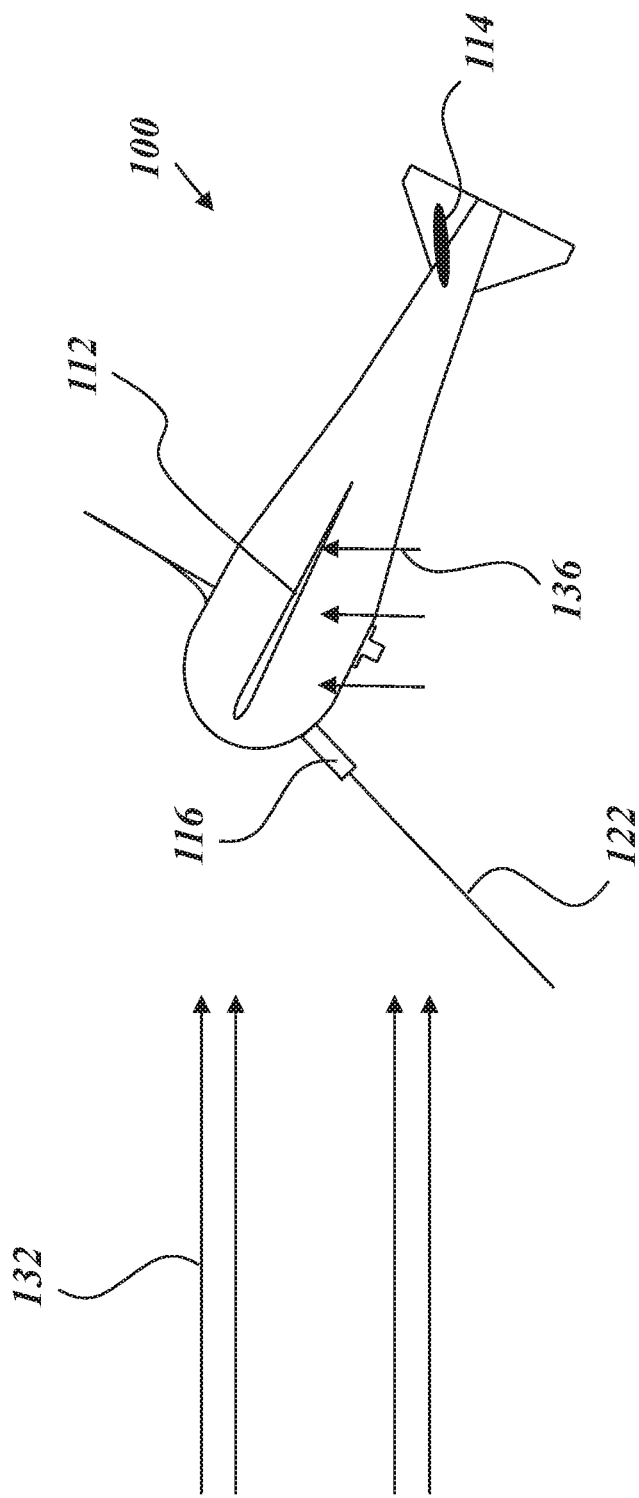
FIG. 4B is a diagrammatic illustration of a submersible telemetry platform shown from the side having tilted control surfaces for harnessing the flow of water and generating upward lift according to aspects of the present invention.

By using the attitude control surfaces 114 to control the pitch in this manner, the telemetry platform 100 can generate a directional force capable of adjusting the depth of the telemetry platform 100 in a controlled (e.g., predetermined) manner, as desired. When the pitch is nonzero, the lift-generating surfaces 112 are tilted or angled with respect to the direction of water flow. This is shown in FIG. 4B. According to the principles of fluid dynamics, and as well understood by one of skill in the art, the presence of an angle of attack between the lift-generating surfaces 112 and the direction of water flow generates a lift. Specifically, the lift is generated in response to the difference in velocities of water flowing over the lift-generating surfaces 112 and under the lift-generating surfaces 112. As described previously, the lift generated by lift-generating surfaces 112 is governed by the same principles that cause changes in the ramp angle of surfaces 114 to adjust the pitch in a desired manner.

The lift generated by the lift-generating surfaces 112 can cause the telemetry platform 100 to elevate, descend, or remain at a fixed depth (e.g., depending on if the lift that is generated is positive, negative, sufficient to produce a balancing tension in the tether 122, etc.). In illustrative embodiments, the telemetry platform 100 is built to possess sufficient minimal buoyancy to naturally rise in water. This prevents entanglement of and entanglement with the tether 122 in the event that there is no ambient water velocity. To maintain a substantially fixed depth below the surface of the ocean in the presence of a current, the telemetry platform can adjust the attitude control surfaces 114 to apply a constant negative or downward lift that cancels out the positive or upward lift due to natural buoyancy of the telemetry platform 100.

Figure 4C:
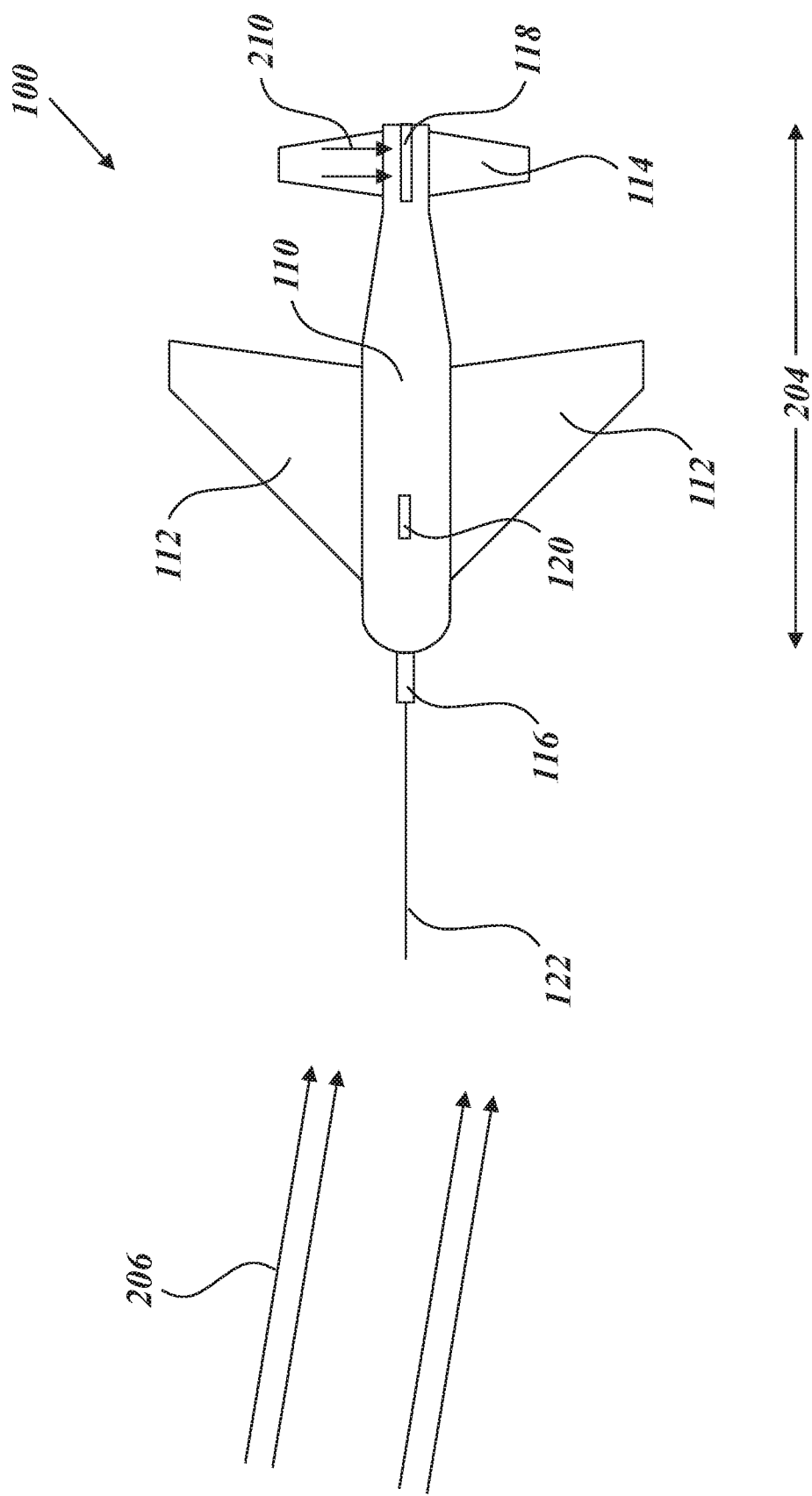
FIG. 4C is a diagrammatic illustration of a submersible telemetry platform shown from above illustrating the fixed lift-generating surfaces and moveable attitude control surfaces according to aspects of the present invention.

When the telemetry platform 100 is in the presence of a current, the two fixed vertical rudder fins 118 operate to align the towbody 110 and tether 122 in the lowest drag configuration. This is illustrated in FIG. 4C, which depicts the telemetry platform 100 from above. Occasionally, the direction 206 of the current will change such that the length 204 of the telemetry platform 100 is no longer lying along the path of the water flow 206. In such a scenario, the rudder fins 118 split the path of the oncoming water in such a way that generates a sideways force 210. The sideways force 210 is produced by the difference in velocities of water flowing along each side of the rudder fins 118. The sideways force 210 is unbalanced, and thus causes rotation of the telemetry platform 100 about a vertical axis passing through the location of pivot point 215. This rotational motion (i.e., yaw) realigns the length 204 of telemetry platform 100 with the direction 206 of water flow. This realignment reduces the number and area of faces and surfaces exposed to oncoming water, which reduces drag on the telemetry platform 100.

Similarly to how the towbody 110 rotates to minimize drag, the rotating arm 142 can also rotate in order to minimize drag on the tether 122. As the current changes direction, a higher surface area on the tether 122 will be impacted by the water. This will cause the tether and the rotating arm 142 to rotate about the base 140, in the direction indicated by arrow 184 in FIG. 3A, such that the tether 122 and the telemetry platform 100 are always tending to be aligned with the current direction.

Accordingly, given that the telemetry platform 100 can change its position in any polar coordinate about the base 140, the telemetry platform 100 is equipped with freedom-of-motion through any Cartesian axis. Stated differently, the only constraint on the motion of the telemetry platform 100 is imposed by the length of the tether 122. This represents an improvement over existing telemetry platforms that are tethered to a surface mooring and thus are more limited in their motion. By allowing such increased mobility as well as the ability to move vertically in the water, the telemetry platform 100 enables near real-time telemetry without requiring frequent repair of damage suffered while at the surface of the ocean.

The example environment for operating the illustrative telemetry platform 100 is an ocean. In general, the illustrative telemetry platform 100 operates in two primary operational modes: a submersed mode and a surfaced mode. The electronic control unit 127 thus is configured to control operation of the telemetry platform 100 in each of these modes. Furthermore, between these two modes exists two distinct transit modes, when the telemetry platform 100 is in transit up to or down from the surface of the body of water or other liquid within which the telemetry platform 100 is submersed. While the example environment is an ocean, the telemetry platform 100 can operate in a wide range of liquids, which include but are not limited to water.

The telemetry platform 100 is depicted in the submersed mode in FIG. 5. The illustrative telemetry platform 100 preferably spends a majority of its time in the submersed mode, to gather data for transmission and protect the telemetry platform 100 from biofouling, wave action, and other surface hazards. When submersed, the attitude control surfaces 114 are angled downward, causing the lift-generating surfaces 112 to generate a slightly negative lift, which balances the natural buoyant force of the telemetry platform 100 according to the principles already described herein and readily understood by one of skill in the art. The towbody 110 is highly streamlined so as to incur low drag forces, even in high current conditions, when the towbody 110 is in the submersed condition. The balance of forces maintains the telemetry platform 100 at substantially the same subsurface depth, preferably, about one hundred meters in illustrative embodiments adapted for deep-sea oceanographic exploration. In the submersed mode, the tether swing attachment arm 116 rotates to the forward position, which places it in line with the center of drag of the towbody 110, thus permitting stable operation in the submersed condition. While submersed, the telemetry platform 100 receives and buffers data from the subsurface equipment. As depicted in FIG. 5, the telemetry platform 100 is at substantially the same depth as the base 140. The base 140 is connected to an example subsurface assembly, comprising illustrative equipment 140, 144, 146, 148, and 150 (among other equipment), also shown in FIGS. 3A and 3B and described in detail previously.

Upon completion of a predetermined amount of data collection, or at one or more predetermined times, the telemetry platform 100 can engage a lift-generating mechanism as described herein and rise to the surface. If so desired, the telemetry platform 100 can be set to an automatic schedule such that it rises at evenly or unevenly spaced intervals. Optionally, the telemetry platform 100 can be equipped with an internal controller that is configured to postpone surfacing when the sea state is rough or some surface obstacle is present that would interfere with telemetry. For example, in some alternative embodiments, the telemetry platform 100 can determine wave conditions using a hydrophone to measure the ambient acoustic noise level. Acoustic noise level rises when breaking waves are present at the surface. In such embodiments, surfacing preferably is delayed until the acoustic noise level quiets. Another alternative embodiment would include an ice-detection system in the telemetry platform 100, enabling the platform 100 to remain submersed when floating ice is present at the surface. Embodiments of the present invention enable the telemetry platform 100 to control the specific rate at which it ascends (or descends). One skilled in the art can appreciate that, given the presence of a non-zero current speed, this rate can be changed and adjusted as desired by adjusting the angle of attack of the lift-generating surfaces 112 and the ramp angle of the attitude control surfaces 114. For deep water environments, one skilled the art will further appreciate that it may not be necessary to control the rate of rise, because as the telemetry platform 100 rises from the submersed position, the tether 122 becomes increasingly vertical. This causes the tension in the tether 122 to increase so as to limit the motion (and rate of rise) of the platform 100.

As the telemetry platform 100 rises in the ocean, the exposed end of the tether swing attachment arm 116 is pulled down from the nose of the towbody 110 to the underside of the towbody 110. The tether swing attachment arm 116 thus can rotate about its attachment point with the towbody 110, in accordance with this force. Permitting the tether swing attachment arm 116 to swing in this manner allows the telemetry platform 100 to reduce presence of unnecessary forces on the tether 122 due to bends or kinks. Furthermore, it allows the telemetry platform 100 to rise in elevation (decrease depth) without an unbalanced force or torque pulling down on the nose. Aligning the tether swing attachment arm 116 with the center of lift force, or nearly so (e.g., nearer to the nose of the towbody 110 than the tail of the towbody 110, given its shape in the example embodiment), prevents any such torque from being applied. In the illustrative environment and application, a downward force at the nose is undesirable since it would cause the telemetry platform 100 to pitch down. Such pitching would interfere with intended operation of the attitude control surfaces 114. However, in other embodiments, alternative mechanical features can be implemented that create such a torque and manipulate it in desired ways that control the pitch.

In a similar manner as the tether swing attachment arm 116, the load-bearing swivel 178 and rotating arm 142 can rotate azimuthally to prevent the formation of kinks at the end of the tether attached to the base 140. This has similar potentially beneficial effects of minimizing tension in the tether 122, reducing extraneous stress on the system, and preventing the tether 122 from winding around the base assembly 140 as the direction of the current changes.

Once the telemetry platform 100 breaches the surface, it can engage in telemetry. The telemetry platform 100 automatically stops rising when the lift-generating surfaces 112 intersect the sea/air interface, because the lift-generating surfaces 112 do not generate significant lift force in the air. In an alternative embodiment, the telemetry platform 100 would contain instrumentation, for example a water pressure sensor, configured to actively control the ramp angle of the attitude control surfaces 114 so as to maintain a constant depth relative to the water surface. In illustrative embodiments, the radio telemetry unit is adapted to turn on as the telemetry platform 100 approaches the surface 138 of the body of water (or other liquid) within which the telemetry platform 100 is submersed. A pressure sensor can be included to enable the platform 100 to determine its depth and detect that the telemetry platform 100 is approaching the surface 138. Preferably, telemetry begins as soon as the antenna 120 rises above the water surface 138 and can adequately transmit and/or receive data. Once engaged with a remote receive, telemetry proceeds according to conventional data transfer, as appreciated by one skilled in the art. For example, since radios generally cannot transmit signals underwater, communication likely will not be established with the remote receiver until the antenna 120 has been above water for a short, limited period of time. Furthermore, the radio modem on the platform 100 and on the remote receiver will exchange preliminary signals in order to establish a connection.

The telemetry platform 100 is shown in the surfaced mode in FIG. 6. The radio telemetry antenna 120 sends the buffered data to shore via satellite or other radio telemetry system when the telemetry antenna 120 is above water. In addition to transmitting data, the telemetry antenna 120 can also receive radio or satellite communication containing data or instructions, if so desired. The specific types of antennas, the suitable electronic components, and other telemetry-related equipment are well known in the art and thus are not described in great detail herein. The illustrative telemetry platform 100 is suitable with a wide variety of equipment and can be configured for a wide variety of functions.

In the surfaced mode, the point of attachment of the tether 122 to the swing arm 116 has swung down such that the exposed end of the arm 116 is below the underside of the towbody 110. The attitude control surfaces 114 remain at an angle to generate lift and maintain the telemetry platform 100 in the surfaced mode. While FIG. 6 only depicts the antenna 120 breaching the surface 138, in actuality a portion of the towbody 110 may also be above water. In either instance, telemetry may be possible. The towbody 110 may not need to break the surface 138 of the water to initiate telemetry. Preferably, a portion of the towbody 110 rises above the surface, up to the point where the lift-generating surfaces 112 break the surface 138. In general, any such configuration wherein a portion of the telemetry platform 100 is above water in order to engage in telemetry can be an example of the "surfaced mode." Preferably, the surfaced mode lasts only a short time compared to the time the telemetry platform 100 is in the submersed mode, for example, not more than about 1 minute out of every 10 minutes. This value is merely exemplary and in no way limits the invention. During this time data is transmitted and/or received by the antenna 120 and the internally mounted telemetry electronic system.

Subsequent to telemetry, the telemetry platform 100 descends back to its resting depth below the surface 138 and remains in submersed mode to gather additional data. Descent is accomplished by angling the surfaces 114 downward to pitch the nose of the towbody 110 down. The downward pitch generates negative lift on the surfaces 112, which causes the telemetry platform 100 to descend until the swing attachment arm 116 has moved to a substantially horizontal position, and the towbody 110 attains a stable low-drag orientation.

In addition to illustrative telemetry platform 100 described herein, many alternative embodiments are possible. For example, the passive tether 122 can be replaced by an electromagnetic tether cable, which can permit electrical power and data to be passed from the subsurface mooring to the telemetry platform 100. This enhancement can prolong the useful deployment lifetime of the telemetry platform 100 and can also eliminate the need for acoustic telemetry between the subsurface mooring and the telemetry platform 100. Many different types of tethers, cables, chains, mooring lines, and other types of lines are possible. All such alternatives and modifications are included in the scope of the present invention.

Furthermore, some alternative embodiments are equipped with different types of lift-generating surfaces 112. One of skill in the art will appreciate that alternate implementations are possible for converting current into lift. For example, it may not be necessary to include separate adjustable attitude control surfaces 114 to manipulate the pitch and thus the amount of lift generated. Rather, it may be possible in alternative embodiments to provide the lift-generating surfaces 112 with rotatable capability, such that the lift-generating surfaces 112 are rotatably attached to the sides of the towbody 110 at a location slightly ahead of pivot point 215 in FIG. 2. In this manner, controlling rotation of the lift-generating surfaces 112 is sufficient to generate a particular desired directional lift in response to flowing water, while desirably maintaining a stable pitch. In such embodiments, the attitude control surfaces 114 are not necessary to adjust the depth of the telemetry platform 100. As an additional alternative embodiment, fixed rear fins, or a circular ring-shaped fin, can be implemented, along with moveable elements that permit the lift-generating surfaces 112 to rotate as desired. Furthermore, the particular position of lift-generating surfaces 112 and the attitude control surfaces 114 can be changed. One of skill in the art will appreciate a range of alternative embodiments implementing the feature of converting water flow into lift in yet other ways.

Alternative embodiments can also include other features in addition to those described in detail herein. For example, the telemetry platform 100 can include equipment that harvests electrical energy from the ocean current flow past the device. In one example embodiment illustrated in FIG. 7, the telemetry platform 100 includes an impeller 160 at the downstream-facing end (i.e., tail end) of the towbody 110. The impeller 160 converts current flow into rotary motion of a shaft coupled with a rotating generator. This produces electrical current that can be stored in rechargeable batteries on board the telemetry platform 100. Such an addition can free altogether the telemetry platform 100 from dependence on finite battery capacity. Additionally, the power that is generated can be used for longer deployments, at the expense of greater drag forces on the unit. If used in combination with an electromechanical cable in place of the tether 122, the impeller 160 can permit the telemetry platform 100 to supply electrical power to the underwater oceanographic instruments as well as to its own internal electronics.

Furthermore, in some additional embodiments, oceanographic sensors, profiling sensors, and other sensors are included in the telemetry platform 100 and positioned on the towbody 110. These and other sensors can be used to obtain detailed profiles of current, temperature, salinity, and other water properties in the upper layer of the ocean. In such embodiments, profiles can preferably be obtained when the telemetry platform 100 is in motion to or from the surfaces of the body of water. The specific types of sensors that are used can vary, and depend on the intended application of the telemetry platform 100, as well as the type of data that is desired.

Figure 8A:
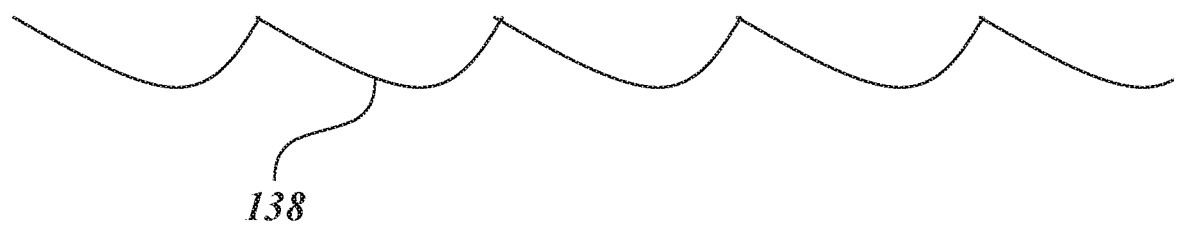
FIG. 8A is a diagrammatic illustration of an alternative embodiment of an energy-generating submersible telemetry system having a submersed configuration in an example underwater environment according to further aspects of the present invention.
Figure 8A:
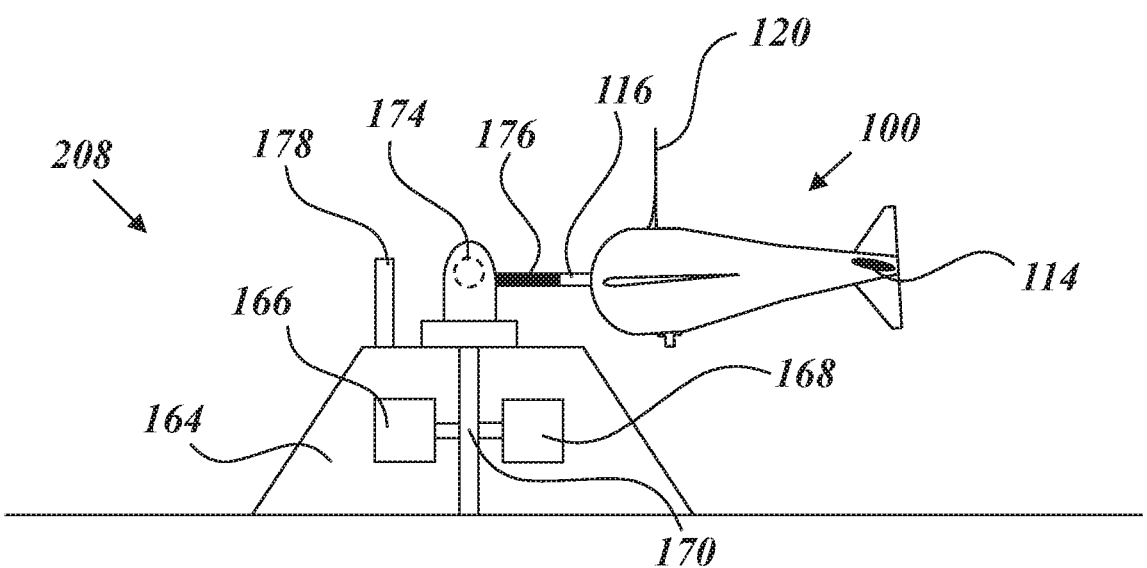
Figure 8B:
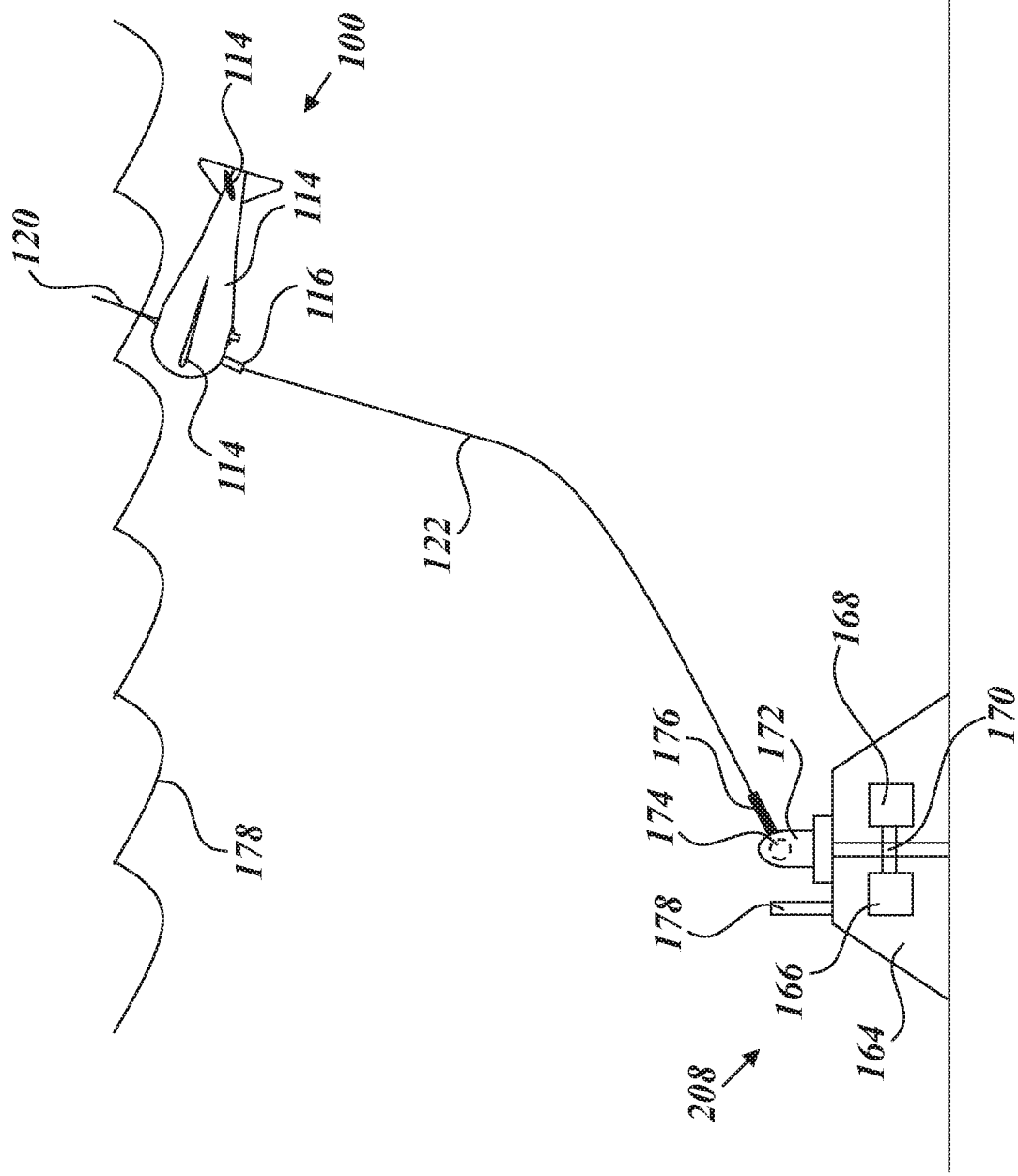
FIG. 8B is a diagrammatic illustration of an alternative embodiment of an energy-generating submersible telemetry system having a surfaced configuration in an example underwater environment according to further aspects of the present invention.

A further illustrative embodiment of the present invention is depicted in FIGS. 8A and 8B. In particular, FIGS. 8A and 8B depict a telemetry platform 100 that is particularly well-suited for shallow-water (or other shallow liquid) environments. The telemetry platform 100 is not connected to a subsurface mooring assembly such as that depicted in FIGS. 3A and 3B. Rather, the telemetry platform 100 is tethered to base 208, which is firmly anchored to the subsurface floor. Anchoring can include an attachment mechanism for attaching the base 208 to the subsurface floor, or it can be achieved by providing a base 208 that is sufficiently weighted. The base includes a load-bearing swivel 174 with a tether feed-through (not shown), a slip ring (not shown), and a torque arm assembly 172. The tether cable 122 passes through the torque arm 176 and the slip ring, and is connected to a cable drum 170. The torque arm assembly 172 is configured to allow a torque arm 176 to swivel around in any direction necessary to follow the telemetry platform 100 as it moves in response to current and generates lift, described previously herein. The torque arm 176 can rise to any angle such that the tether cable 122 always has a lead and does not tangle.

The cable drum 170 is located inside the base 208, and allows the tether cable to be wound and unwound such that the telemetry platform 100 reels in and out from the base 208. The cable drum 170 is preferably configured to have capacity for the entire length of the tether cable 122, but is only wide enough for a single turn of the cable. This can be useful, e.g., in ensuring that the tether cable 122 winds in a continuous spiral and cannot undercut itself on the drum 170 and become jammed.

A tether cable tension assembly 168 is preferably coupled to, and maintains a nearly constant pull-in torque on, the cable drum 170. The pull-in torque tends to wind the drum 170 and reel in the tether 122. In one embodiment, the tension assembly 168 includes a metal spiral spring. However, one of skill in the art will appreciate that the same function may be obtained through use of a hydraulic motor and hydraulic pressure cylinder assembly, or any other known mechanism for creating a constant tension or torque on the drum 170. All such alternatives are contemplated within the scope of the present invention. The drum 170 is also coupled to an electrical generator assembly 166 configured to convert motion of the tether 122 into electricity. For example, the electrical generator assembly 166 can include an electrical generator. In illustrative embodiments, the electrical generator assembly 166 is configured to generate electricity when the drum 170 rotates to reel out the telemetry platform 100. However, in alternative embodiments, the electrical generator assembly 166 is configured to generate electricity when the drum 170 rotates to reel in the telemetry platform 100, as would be appreciated by one of skill in the art upon reading the present specification. The electrical generator assembly 166 preferably includes a rechargeable battery for storing energy that is generated. The rechargeable battery can be used to power sensors, a data acquisition system, a telemetry system, and an attitude control system (including the manipulation of surfaces 114). The cable drum 170 is preferably located in a free-flooding enclosure, while the electrical generator assembly 166 is preferentially located inside a pressure-balanced oil-filled housing. A rotating shaft connects the drum 170 with the electrical generator assembly 166 through a rotary seal on the oil-filled enclosure. The enclosure can be constructed from a non-corrodable material such as (but not limited to) stainless steel, fiberglass, or other plastic.

The base 208 can also include a current profiler and directional wave sensor 178 for profiling ocean current and gathering oceanographic data. The telemetry platform 100 generally can be identical to that described herein in regards to the previous embodiment of FIGS. 1A through 2.

The further example embodiments depicted in FIGS. 8A and 8B are preferable for a shallow-water environment. Particularly, shallow-water systems of FIGS. 8A and 8B are intended for rapid real-time telemetry in water depths of about 10-50 meters. In operation, there are two basic configurations or operational modes: submersed mode and surfaced mode. These modes are similar to those depicted in FIGS. 5 and 6 and described previously herein. In the submersed mode, the angle of attack of the lifting surfaces 112 is adjusted using the tail control surfaces 114 to create a downward force which counteracts the telemetry platform 100's buoyancy, thereby permitting the telemetry platform 100 to achieve a low-drag submersed configuration, such that the tension assembly 168 can reel in the tether and bring the telemetry platform proximal to the weighted base assembly. This is illustrated in FIG. 8A. This low-drag submersed mode of operation is possible whenever a current is present (even a small current), since the buoyancy force is not large and is easy to overcome with a slight angle of attack of the lifting surfaces 112, as depicted by the slight downward pitch of the telemetry platform 100 in FIG. 8A.

In the surfaced mode, the attitude control surfaces 114 are activated to adjust the angle of attack of the lift-generating surfaces 112 to create a relatively large upward force, which causes the cable to be pulled out of the cable drum 170 against the pull-in torque of tension assembly 168, until the telemetry platform 100 reaches the water surface 138. This is illustrated in FIG. 8B. Cable drum 170 rotates as the cable is pulled out, and this also rotates the electrical generator in electrical generator assembly 166. As with the example embodiment of FIGS. 1 through 7, the telemetry platform 100 depicted in FIGS. 8A and 8B similarly operates in a first transit mode during which the telemetry platform 100 is rising (e.g., to the surface 138) and a second transit mode during which the telemetry platform 100 is descending (e.g., from the surface 138).

In illustrative embodiments, the electrical generator in the assembly 166 is configured to generate electricity when the cable drum 170 turns as a result of the telemetry platform 100 reeling out. Accordingly, power is created during the time period when the telemetry platform 100 is rising to the surface 138. In essence, electrical power generation is harvested from the force created by the flow of water over the surfaces 112 combined with the velocity of the cable pull-out. The same movement of the telemetry platform 100 toward the water surface 138 that generates electricity also serves to re-wind the tension assembly 168 so it is ready for another cycle of motion.

In the complete absence of current, there is no lifting force acting on the surfaces 112, and under this circumstance, the telemetry platform 100's buoyancy overcomes the reel-in tension of the tension assembly 168, and the telemetry platform 100 will tend to rise to the surface where telemetry can be performed. Upward motion of the telemetry platform 100 due to buoyancy alone will be slow and no signification amount of electrical energy will be generated by its upward motion.

In alternative embodiments, the natural torque applied by the tension assembly 168 to the cable drum 170 can produce a tension in the tether 122 that is greater than the tension created by the natural buoyancy of the telemetry platform 100. Accordingly, in such alternative embodiments, when water conditions are still or when the attitude control surfaces 114 are not angled to generate lift, the telemetry platform 100 is in submersed mode.

As with the example embodiment of FIGS. 1 through 7, the telemetry platform 100 of FIGS. 8A and 8B can receive data via the acoustic telemetry unit 124 when submersed and rises to the surface 138 to transmit the collected data.

In addition to the lift-generating surfaces 112 and the attitude control surfaces 114, alternative mechanisms can be utilized to enable the telemetry platform 100 to rise to the surface in a controlled manner. In particular, the cable drum 170 optionally can use power (e.g., power that is created by the electrical generator assembly 266 during high currents) to actively unspool the tether cable 122 from the drum 170. This may be particularly advantageous when the current speeds are insufficient to generate enough lift to overcome the normal tension created by the tension assembly 168.

Once the telemetry platform 100 breaches the surface 138, it engages in telemetry. FIG. 8B depicts the shallow-water telemetry platform 100 in surfaced mode. Data transmission can occur as previously described herein. A radio telemetry unit sends the buffered data to shore via satellite or other radio telemetry system when the antenna 120 is above water.

While the electricity-generating mechanism is described herein as a component of the shallow-water telemetry platform 100, this mechanism for manipulating the current to generate energy can also be used in absence of the telemetry components or equipment. For example, it is sufficient to include a movable, attitude-controlled, towed apparatus at the end of a retractable line that is connected to a spool assembly. In such embodiments, as would be appreciated by one of skill in the art upon reading the present specification, such a controllable apparatus can include a towbody 110 with the lift-generating surfaces 112 and the attitude control surfaces 114 coupled thereto. The towbody 110 additionally can include the swing arm 116 coupled thereto, as previously described herein and as would be appreciated by one of skill in the art upon reading the present specification. The spool assembly can include a cable drum or any other variety of known mechanical implementations for reeling in and out a retractable line, as previously described herein. As also described previously herein, the spool assembly can be coupled to a tension assembly for applying a natural tension in the retractable line, and the natural tension can be greater than the force on the controllable apparatus when it is in a low-drag configuration but less than the lift generated on the apparatus during typical current conditions when a significant angle of attack of the lift-generating surfaces 112 is maintained. Such "typical conditions" can vary depending on the intended application and are well known in the art. The present invention is not limited to any single water conditions. Rather, embodiments of the present invention can be implemented for a wide variety of different underwater environments, as would be readily appreciated by one of skill in the art upon reading the present specification. Additionally, the spool assembly can be coupled to an electrical generator assembly for creating power in response to unwinding rotational motion of the spool assembly.

The underwater electricity-generating mechanism described herein can also be implemented using other known lift-generating surfaces besides the lift-generating surfaces 112. Furthermore, an electromechanical cable can be used in place of the tether 122, to provide transfer of data and power between the base 208 and the controllable apparatus. Other such alternatives providing additional functions that are known in the art are also contemplated within the scope of the invention.

The illustrative energy-harvesting embodiment thus distinguishes over existing underwater power-generating assemblies, which do not involve reeling in and out a controllable apparatus. One possible reason why existing systems do not use retraction is that most existing underwater power-generating assemblies utilize impellers or other rotating parts exposed to the water flow, and do not utilize dynamic lift generated by the attitude-controlled towbody 110. The advantage of the attitude-controlled dynamic lift power source is that it can generate electrical power in the course of performing other functions, while remaining in a protected, low-vulnerability condition most of the time. This results in episodic energy generation, which is sufficient to power typical oceanographic sensors and telemetry systems that can optionally be included (e.g., as depicted in FIGS. 8A and 8B). Impeller-type power generation systems require that the structure supporting the impeller must be located at all times in high-current conditions, which results in high drag and larger structures. As such, the retractable dynamic lift system offers a versatile mechanism for generating electricity that is suitable in a wide range of underwater environments, and at a wide range of depths, whereas only a relatively small amount of electrical energy is required. One skilled in the art will further appreciate that the retractable dynamic lift system can be used in many other underwater applications besides telemetry, or can be used purely as an energy-generating mechanism.

The telemetry platforms described herein according to example embodiments of the present invention offer many benefits over existing technology. Such telemetry platforms according to example embodiments of the present invention can be implemented for near real-time telemetry of data, including but not limited to oceanographic and profiling data. Notably, the telemetry platforms 100 described herein possess the desirable characteristic of being free from any surface mooring, float, buoy, or other surface assembly. Furthermore, the telemetry platforms 100 according to example embodiments of the present invention are configured to allow a majority of time to be spent in a safe, low-drag environment, which enhances useable lifetime.

These features are particularly desirable given that existing telemetry platforms have not succeeded in achieving a real time telemetry system that simultaneously offers all such benefits. Conventionally, systems rely on mooring lines to surface buoys or battery power. The illustrative telemetry platforms, on the other hand, reduce reliance on battery power and eliminate the need for surface mooring at least in part by using the natural flow of current to power its lift generating mechanism.

Furthermore, the illustrative shallow-water telemetry platform 100 of FIGS. 8A and 8B is extremely suitable for real-time telemetry or near real-time telemetry of data in shallow-water (or other shallow liquid) environments. Notably, more trips to the surface result in more energy being harvested and stored. Despite providing near-real time telemetry via transmission of data at the surface, the telemetry platform 100 is preferably configured to spend extended periods of time below the surface of water. Additionally, the shallow-water telemetry platform 100 offers decreased dependence on battery power. Together, these features reduce the need for regular repairs and servicing, and prolong the lifetime of the telemetry platform 100.

The illustrative shallow-water telemetry platform 100 of FIGS. 8A and 8B can offer further advantages in applications where it is undesirable to have a visible surface buoy. Such applications might include clandestine military data-gathering operations in hostile territory, where frequently transmitted real-time data would be highly desirable but the presence of a permanently moored surface buoy would be undesirable. The illustrative shallow-water telemetry platform 100 would not be highly visible when it is at the surface for brief periods of time, and moreover it could be programmed to avoid surfacing when the presence of boats is detected, or only to surface during hours of darkness.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. An underwater system for generating electricity, the system comprising:
    a base for storing generated electricity, comprising:
        a spool assembly coupled to a retractable line and configured to wind and unwind the retractable line;
        a tension assembly coupled to the spool assembly and configured to maintain a first tension in the retractable line; and
        an electrical generator assembly configured to generate electricity by converting rotational motion of unwinding of the retractable line from the spool assembly; and
    a submersible controllable apparatus coupled to the retractable line, comprising:
        a body;
        one or more surfaces coupled to the body and configured to produce a controllable second tension in the retractable line by adjusting the one or more surfaces in a manner sufficient to cause the submersible controllable apparatus to rise toward a surface of a body of liquid in which the submersible controllable apparatus is submersed and thereby generating a force using a current of the liquid as it flows across the submersible controllable apparatus, the second tension having a direction that is modifiable between being either opposite or equal to the direction of the first tension; and
        a controller coupled to the one or more surfaces for controlling the one or more surfaces in a manner sufficient to control the controllable second tension;
    wherein when the submersible controllable apparatus is controlled to produce the controllable second tension in the retractable line and generate the force using the current of the liquid, and when the generated force is greater than the first tension in the retractable line, the spool assembly rotates and unwinds the retractable line and the electrical generator assembly generates electricity by converting the rotational motion of the spool assembly into electricity; and
    wherein the submersible controllable apparatus further comprises an impeller coupled to the body of the submersible controllable apparatus at an end of the body configured to face downstream, and a rotating generator coupled to the impeller for generating electricity based on rotation of the impeller.

2. The system of claim 1, wherein the one or more surfaces comprise:
    at least one lift generating surface coupled to the body and configured in such a way as to provide lift to the body when a fluid flows across the lift generating surface; and
    at least one control surface coupled to the body and configured to control a pitch of the body in such a way as to modify lift characteristics of the body between a negative lift and a positive lift.

3. The system of claim 1, wherein the controllable apparatus further comprises telemetry equipment coupled to the body and configured for wireless communication with at least one remote device.

4. The system of claim 1, wherein the base further comprises one or more sensors.

5. The system of claim 1, wherein the controller is configured to operate in one or more of the following modes:
    a submersed mode in which the controller controls the one or more surfaces in a manner sufficient to maintain the controllable apparatus at a substantially constant depth below the surface of the body of liquid;
    a first transit mode in which the controller controls the one or more surfaces in a manner sufficient to cause the controllable apparatus to rise from the substantially constant depth to the surface of the body of liquid;
    a surfaced mode in which the controller controls the one or more surfaces in a manner sufficient to maintain the controllable apparatus at the surface of the body of liquid; or
    a second transit mode in which the controller controls the one or more surfaces in a manner sufficient to cause the controllable apparatus to descend from the surface of the body of liquid to the substantially constant depth below the surface of the body of liquid.

6. The system of claim 1, further comprising a rotatable arm coupling the base to the retractable line, the rotatable arm having freedom-of-movement about a common center point at the base.

7. The system of claim 1, wherein the base comprises an anchored subsurface float or a dead weight seabed anchor.

8. The system of claim 1, wherein the submersible controllable apparatus further comprises a swing arm coupling the submersible controllable apparatus to the retractable line, the swing arm being configured to pivot about a pivot point situated in or on the body.

9. The system of claim 1, further comprising one or more vertical rudder fins coupled to the submersible controllable apparatus for stabilizing the submersible controllable apparatus.

10. The system of claim 1, wherein the submersible controllable apparatus further comprises an internal buoyancy module and a ballast compartment, the internal buoyancy module and the ballast compartment being sized and positioned in such a way that the submersible controllable apparatus has a net positive buoyancy.

11. A method of operating an underwater system for generating electricity, comprising:
providing a base for storing generated electricity, comprising:
  a spool assembly coupled to a retractable line and configured to wind and unwind the retractable line;
  a tension assembly coupled to the spool assembly and configured to maintain a first tension in the retractable line; and
  an electrical generator assembly configured to generate electricity by converting rotational motion of unwinding of the retractable line from the spool assembly;
providing a submersible controllable apparatus coupled to the retractable line, comprising:
  a body;
  one or more surfaces coupled to the body and configured to produce a controllable second tension in the retractable line by adjusting the one or more surfaces in a manner sufficient to cause the submersible controllable apparatus to rise toward a surface of a body of liquid in which the submersible controllable apparatus is submersed and thereby generating a force using a current of the liquid as it flows across the submersible controllable apparatus, the second tension having a direction that is modifiable between being either opposite or equal to the direction of the first tension; and
  a controller coupled to the one or more surfaces for controlling the one or more surfaces in a manner sufficient to control the controllable second tension;
providing the base configured to be anchored at a subsurface location;
providing the retractable line coupling the body with the base;
  an impeller coupled to the body of the submersible controllable apparatus at an end of the body configured to face downstream; and
  a rotating generator coupled to the impeller for generating electricity based on rotation of the impeller; and
causing the submersible controllable apparatus to produce the controllable second tension in the retractable line and generate the force using the current of the liquid, and when the generated force is greater than the first tension in the retractable line, the spool assembly rotating and unwinding the retractable line and the electrical generator assembly generating electricity by converting the rotational motion of the spool assembly into electricity and the rotating generator generating electricity from the rotation of impeller.

12. The method of claim 11, wherein the step of causing the submersible controllable apparatus to rise from an entirely submersed position within the body of liquid to a surfaced position at the surface of the body of liquid comprises controlling one or more attitude control surfaces in a manner sufficient to cause the submersible controllable apparatus to rise from a substantially constant depth to the surface of the body of liquid.

13. The method of claim 12, further comprising causing the submersible controllable apparatus to descend from the surfaced position to the substantially constant depth below the surface of the body of liquid.

* * * * *